United States Patent
Suzuki et al.

(10) Patent No.: US 8,417,094 B2
(45) Date of Patent: *Apr. 9, 2013

(54) APPARATUS FOR RECORDING SIGNALS ON DISK RECORDING MEDIUM

(75) Inventors: Toshihiko Suzuki, Yokohama (JP); Hidenori Hoshi, Yokohama (JP); Hiroaki Endo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

This patent is subject to a terminal disclaimer.

(21) Appl. No.: 12/634,032

(22) Filed: Dec. 9, 2009

(65) Prior Publication Data

US 2010/0080535 A1    Apr. 1, 2010

Related U.S. Application Data

(62) Division of application No. 11/100,851, filed on Apr. 7, 2005, now Pat. No. 7,684,680, which is a division of application No. 09/640,301, filed on Aug. 16, 2000, now Pat. No. 6,904,229.

(30) Foreign Application Priority Data

| Aug. 20, 1999 | (JP) | 11-234287 |
| Sep. 10, 1999 | (JP) | 11-257628 |
| Oct. 26, 1999 | (JP) | 11-304137 |
| Dec. 9, 1999 | (JP) | 11-350467 |

(51) Int. Cl.

| H04N 9/80  | (2006.01) |
| H04N 5/76  | (2006.01) |
| H04N 5/77  | (2006.01) |
| H04N 5/84  | (2006.01) |
| H04N 5/92  | (2006.01) |
| H04N 5/775 | (2006.01) |
| H04N 5/917 | (2006.01) |
| G11B 5/86  | (2006.01) |
| G11B 7/085 | (2006.01) |

(52) U.S. Cl. ........ 386/241; 386/224; 386/225; 386/230; 386/248; 386/294; 386/328; 386/329; 386/332; 386/338; 386/355; 348/231.2; 348/231.3; 369/30.07; 369/47.12

(58) Field of Classification Search .................. 386/241, 386/224, 225, 230, 248, 294, 328, 329, 332, 386/338, 355, E5.001, E5.072, E9.013; 348/231.2, 348/231.3; 369/30.07, 47.12

See application file for complete search history.

(56) References Cited

U.S. PATENT DOCUMENTS

| 5,539,528 A | * | 7/1996  | Tawa ............................. 386/230 |
| 5,581,539 A | * | 12/1996 | Horie et al. ................. 369/275.4 |
| 5,717,671 A | * | 2/1998  | Aramaki ..................... 369/47.12 |

(Continued)

FOREIGN PATENT DOCUMENTS

JP     859511 A1 *  8/1998

*Primary Examiner* — Thai Tran
*Assistant Examiner* — Syed Hasan
(74) *Attorney, Agent, or Firm* — Cowan, Liebowitz & Latman, P.C.

(57) ABSTRACT

A recording apparatus of this invention detects the state of management information, which pertains to a recording address of an image signal, and which is reproduced from a disk-like recording medium having a first area for the image signal and a second area for the management information. On the basis of the detection result, management data is reproduced from the first area of the disk-like recording medium. On the basis of the management data reproduced from the first area, the management information reproduced from the second area is modified. A modify unit records the modified management information in the second area.

33 Claims, 20 Drawing Sheets

U.S. PATENT DOCUMENTS

| | | | |
|---|---|---|---|
| 6,195,503 B1 * | 2/2001 | Ikedo et al. | 386/338 |
| 6,385,389 B1 * | 5/2002 | Maruyama et al. | 386/248 |
| 6,424,795 B1 * | 7/2002 | Takahashi et al. | 386/225 |
| 6,763,182 B1 * | 7/2004 | Endo et al. | 386/224 |

* cited by examiner

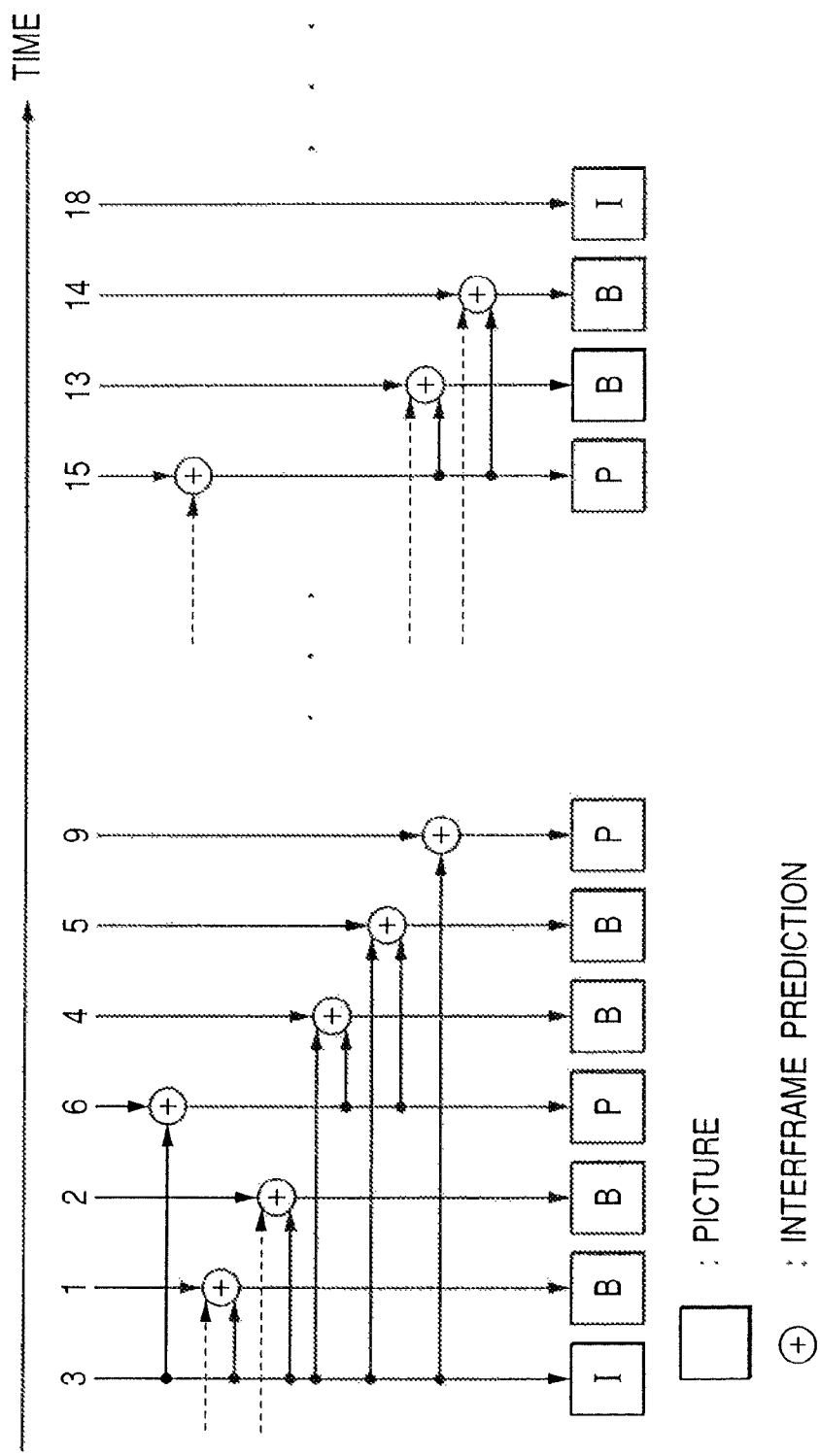

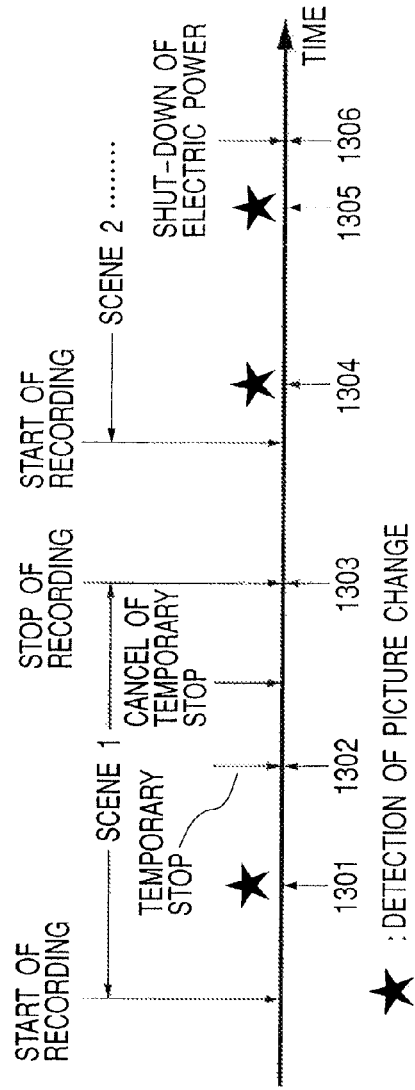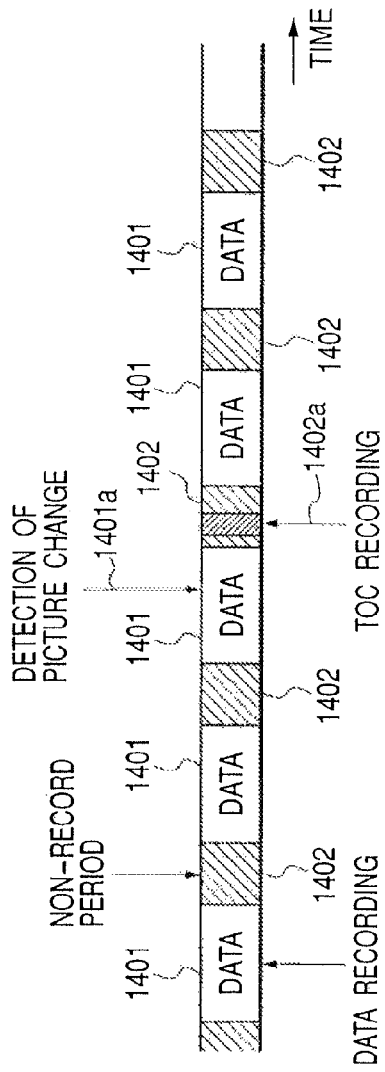

APPARATUS FOR RECORDING SIGNALS ON DISK RECORDING MEDIUM

CROSS-REFERENCE TO RELATED APPLICATIONS

This application is a divisional of application Ser. No. 11/100,851, filed Apr. 7, 2005 now U.S. Pat. No. 7,684,680; which is a divisional of application Ser. No. 09/640,301, filed Aug. 16, 2000, which issued as U.S. Pat. No. 6,904,229 on Jun. 7, 2005, the entire disclosures of which are hereby incorporated by reference.

BACKGROUND OF THE INVENTION

1. Field of the Invention

The present invention relates to an apparatus for recording signals such as image signals on a disk recording medium and, more particularly, to control of management information of recorded signals.

2. Related Background Art

Conventionally, a video tape recorder which records analog video signals on magnetic tapes is available as an image recording apparatus for recording video signals on a recording medium. However, with rapid progress of digital signal processing technologies, digital recording/playback apparatuses which record analog video signals on recording medium by converting the signals into digital video signals are becoming popular at present.

Such digital recording/playback apparatuses include a digital VTR, a digital video disk apparatus which records signals on solid-state disk or magnetooptical disk, and a solid-state memory video apparatus which records signals in a solid-state memory such as a flash memory or an SRAM.

These digital recording/playback apparatuses load a video signal obtained by an image pickup device such as a CCD and convert the signal into a digital signal by A/D conversion. The apparatuses reduce the information amount by compression-encoding this digital video signal. In this manner, these apparatuses can record a large amount of image information in a small recording capacity.

Schemes used as this compression encoding are discrete cosine transform (to be referred to as DCT hereinafter) which is orthogonal transformation having the highest compression efficiency, and a variable-length coding scheme. To perform compression encoding, a single image is first segmented into a plurality of blocks each having x horizontal pixels and y vertical pixels, and DCT transform is performed for each block. A DCT coefficient after the transform is divided by a certain divisor, and the remainder is rounded, thereby performing quantization. By using the characteristic that a quantized image is concentrated in low-frequency components, the number of bits of high-frequency components is reduced. In this way, the information amount is greatly reduced.

The information amount can be further compressed by performing variable-length encoding, e.g., Huffman coding, which assigns to the quantized data a code length corresponding to the occurrence frequency of the data.

Furthermore, greater compression can be attained by combining interframe predictive encoding which calculates the difference between frames, by using the characteristic that a motion image has a strong correlation between frames.

Of this type of recording/playback apparatuses, the capacities of disk media of disk apparatuses are rapidly increasing in recent years. Consequently, apparatuses which record and play not only audio signals but video signals in and from a disk medium for a long time have been proposed. For example, a technique has been proposed which uses a recording format based on high-efficiency encoding such as MPEG using, e.g., DCT and variable-length encoding described above, and which can realize a recording/playback apparatus which records video signals for one hour or more at data rates of about 4 Mbps and 10 Mbps. Furthermore, disk media themselves are being reliably decreased in size and increased in capacity.

In an image recording apparatus which records video signals on a disk medium by reducing the information amount by compressing the signals by combining the aforementioned compression techniques, the information amount varies in accordance with an image because variable-length encoding is used. Therefore, a rate control means for holding the information amount constant is used to uniformize the recording rate of images, thereby recording images in a predetermined recording media capacity within a predetermined time.

This rate control uniformizes the rate by writing compressed data having variations into a certain predetermined buffer and reading out the data at a constant rate. That is, buffer control is performed such that if the data may exceed a predetermined value of the buffer, the quantization level described above is increased to raise the compression ratio; if the buffer does not satisfy the predetermined value, the quantization level is decreased to lower the compression ratio.

In constant bit rate recording (CBR recording), the recording rate is held constant by giving priority to the target time of recording on a recording medium. Hence, if an input image moves fast or has a wide color band, quantization becomes coarse to make the image nonuniform between frames. Therefore, an image recording apparatus which performs variable bit rate recording (VBR recording) by attaching importance to image quality has been proposed. This VBR recording performs encoding giving priority to image quality by holding the quantization level of recording at a substantially constant value, while allowing fluctuations of the recording rate.

A recording/playback apparatus like this uses management information called Table of Contents (to be referred to as a TOC hereinafter) to control video data recording and playback operations. When video data obtained by image pickup is recorded on a recording medium, the TOC information is recorded in an area formed on the inner peripheral side of the disk medium independently of an area for recording video data. In playback operation, the TOC information is read out from the disk medium and held in an internal memory of the apparatus. On the basis of this TOC information, the position of access to the disk medium and diverse operations such as video data playback management are controlled.

Examples of operations managed using the TOC are an operation of linking data of one scene, which are discontinuously recorded on a recording medium, and continuously displaying back the data, an operation of deleting a scene once obtained by image pickup, and an operation of recording a scene newly obtained by image pickup in a free space formed by deletion.

In any of these operations, video data is recorded in an area (video recording area) formed near the center in the radial direction of a disk medium, and the TOC information is saved in an area (system information management area) formed inside the image recording area. Note that no data can be recorded in the outer periphery of the disk.

Since the TOC is important information necessary to recording/playback, the reliability is improved by, e.g., recording the TOC a plurality of times in the system management area of a disk.

In conventional image pickup recording/playback apparatuses, the TOC is recorded on a disk after video data is completely written in the medium. That is, after the recording end pointer (address) of video data on a disk is determined, various pieces of information including an end pointer and start pointer are recorded as the TOC information.

If, therefore, one recorded scene extends over a long time period, no TOC information may be recorded for long periods of time.

Also, a system using a disk medium can rapidly access data in the disk medium, so recording or playback access to the disk medium is usually intermittently performed. Between this disk access operation and other operations, large differences are produced in consumption power such as motor driving power, head driving power, and write laser power.

When a series of recording operations are performed with battery driving, therefore, the battery supply voltage lowers with an abrupt rise of the consumption power upon disk access. This sometimes makes the recording operations of the system impossible to perform.

Especially when the TOC information is to be recorded, the write operation is performed by moving a recording/playback head mechanism from the video recording area for recording video data to the system management area in a remote position. Hence, if the battery amount remains to such an extent that a video data recording operation is marginally possible, the TOC information cannot be written in the worst case.

If the TOC information is missing, the start pointer, end pointer, attribution, and the like of recorded video data are unknown, so disk medium playback control cannot be performed.

Also, even if the reliability of the TOC data is improved as described previously, recording is sometimes abnormally terminated in the middle of a scene by, e.g., careless handling by a user, running out or abrupt discharge of a battery, a defect of a recording medium, or some external cause. In a case like this, actually recorded images and sounds and additional data sometimes disagree with the contents of the TOC. This makes playback of the scene based on the TOC impossible.

SUMMARY OF THE INVENTION

It is an object of the present invention to solve the above conventional problems.

It is another object of the present invention to reliably record management information such as TOC information on a recording medium without losing the management information, even when the remaining battery amount becomes insufficient during image pickup recording.

It is still another object of the present invention to normally reproduce a recorded signal halfway even when recording of the signal is not normally completed.

To achieve the above objects, according to one aspect of the present invention, there is provided a recording apparatus comprising reproducing means for reproducing management information pertaining to a recording address of an image signal from a disk-like recording medium having a first area for the image signal and a second area for the management information, control means for detecting the state of the reproduced management information by using the management information and, on the basis of the detection result, controlling the reproducing means to reproduce management data from the first area of the disk-like recording medium, modifying means for modifying the management information reproduced from the second area, on the basis of the management data reproduced from the first area, and recording means for recording an image signal in the first area of the disk-like recording medium and recording the management information modified by the modifying means in the second area.

Other objects and features of the present invention will become apparent from the following detailed description of embodiments of the invention taken in conjunction with the accompanying drawings.

BRIEF DESCRIPTION OF THE DRAWINGS

FIG. 12 is a view for explaining encoding by the apparatus shown in FIG. 10;

FIG. 13 is a timing chart showing the recording timings of TOC data in the apparatus shown in FIG. 1;

FIG. 14 is a timing chart showing the recording timings of an image signal in the apparatus shown in FIG. 10;

DETAILED DESCRIPTION OF THE PREFERRED EMBODIMENTS

Preferred embodiments of the present invention will be described in detail below with reference to the accompanying drawings.

Figure 1:
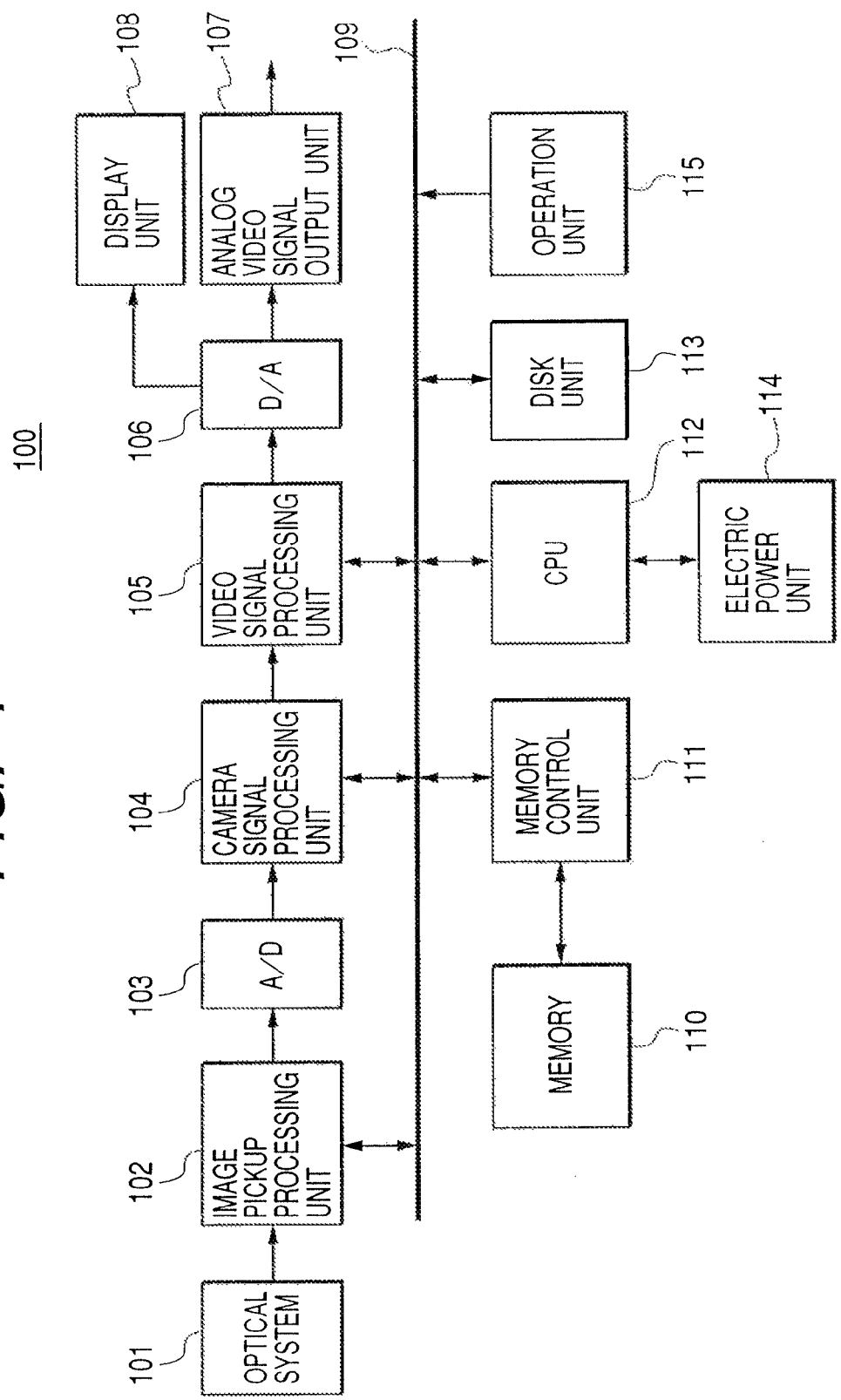
FIG. 1 is a block diagram showing the configuration of a recording apparatus according to an embodiment of the present invention.

FIG. 1 is a block diagram showing the configuration of a recording/playback apparatus 100 according to the first embodiment of the present invention. Referring to FIG. 1, this recording/playback apparatus 100 comprises an optical system 101 including, e.g., a lens and a lens controller, an image pickup processing unit 102, an A/D converter 103, a camera signal processing unit 104, a video signal processing unit 105, a D/A converter 106, an analog video signal output unit 107, a display unit 108, a data bus 109, a memory 110, a memory controller 111, a CPU 112, a disk unit 113, an electric power unit 114 such as a battery, and an operation unit 115 including, e.g., a power switch and a recording trigger switch. For the sake of simplicity, the electric power unit 114 is connected only to the CPU 112 in FIG. 1. In reality, however, electric power is supplied to all units requiring power via power lines.

In this recording/playback apparatus 100, the optical system 101 including a lens performs iris control, focusing control, zoom control, and the like. The image pickup processing unit 102 photoelectrically converts an object image (not shown) by a CCD (Charge-Coupled Device) or the like. The A/D converter 103 converts the obtained analog image signal into a digital signal. The camera signal processing unit 104 performs predetermined data processing such as gamma correction and white balance adjustment for the digital image data.

In recording operation, the video signal processing unit 105 segments the output image data from the camera signal processing unit 104 into a plurality of blocks each composed of a plurality of pixels, performs orthogonal transformation such as DCT for each block, and quantizes and encodes the blocks. Generally, a change between two continuous frames is small in motion image data, so an image of interest has high correlations with images before and after that image. By using this characteristic, the differences between an image of interest and images of frames before and after the image of interest are encoded to perform image compression. An MPEG scheme is used most frequently by which the difference between images is obtained after motion compensation is performed to reduce the redundancy in the time axis, and orthogonal transformation such as DCT and variable-length coding are performed on the obtained differential data.

The image data compressed and encoded by the video signal processing unit 105 is output to the disk unit 113 and recorded on a magnetooptical disk, as will be described later.

In playback operation, image data reproduced by the disk unit 113 is output to the video signal processing unit 105. The video signal processing unit 105 performs decoding, which is the reverse of encoding performed during recording, for the reproduced image data to expand its information amount, and outputs the decoded data to the D/A converter 106.

The D/A converter 106 converts the output digital video signal from the video signal processing unit 105 into an analog signal. The video signal output unit 107 converts this analog signal into a signal following a television system, such as NTSC or PAL, and outputs the signal. The display unit 108 is, e.g., a viewfinder or a liquid crystal monitor and allows a user to monitor an image currently being picked up, or a reproduced image, on the basis of the output analog video signal from the D/A converter 106.

The CPU 112 controls the operation of the whole recording/playback apparatus 100 via the data bus 109. The CPU 112 also controls parameters in the image pickup processing unit 102, the camera signal processing unit 104, and the video signal processing unit 105. The memory control unit 111 controls data write to and read from the memory 110 in accordance with a control signal from the CPU 112.

The arrangement of the disk unit 113 will be described below with reference to FIG. 2.

Figure 2:
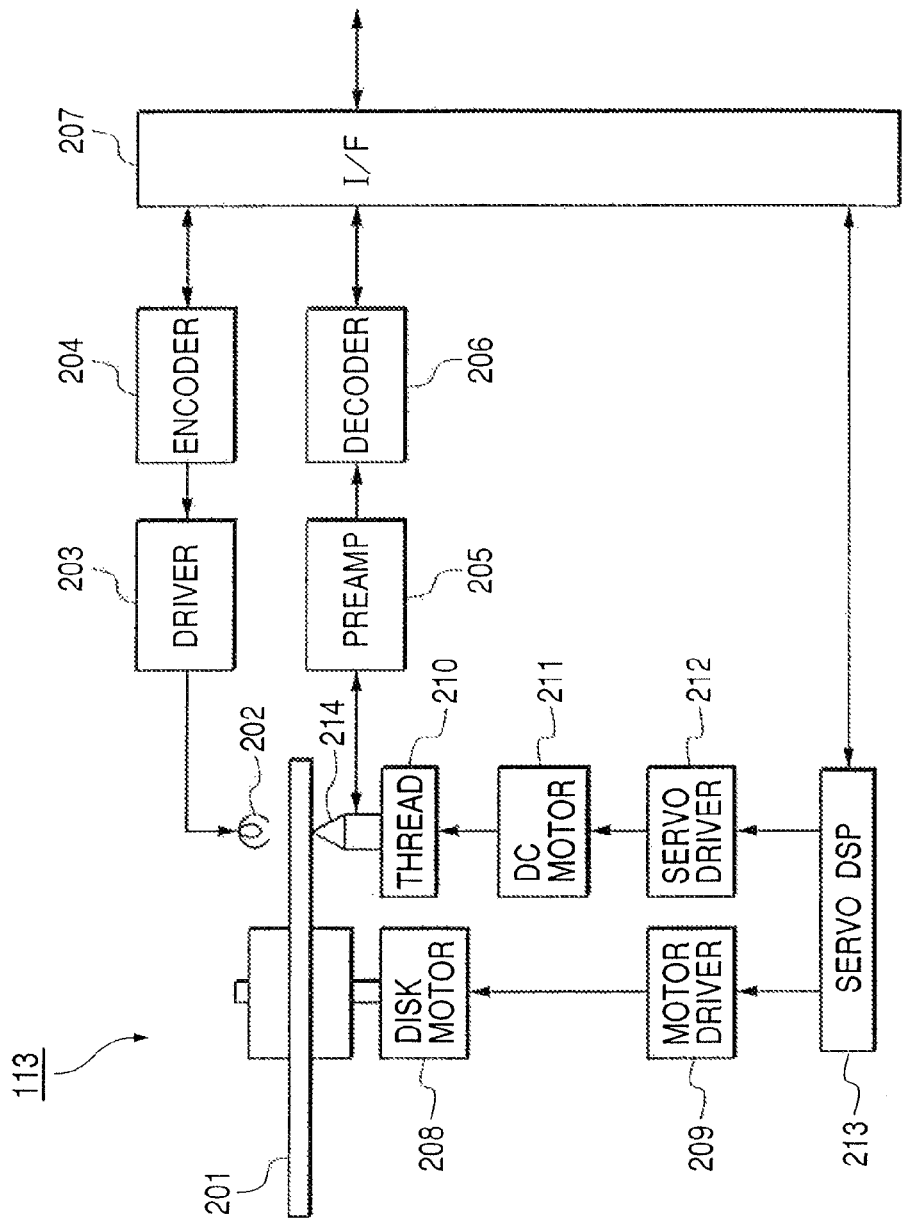
FIG. 2 is a block diagram showing the arrangement of a recording unit shown in FIG. 1.

FIG. 2 is a block diagram showing the arrangement of the disk unit 113.

Referring to FIG. 2, this disk unit 113 includes a magnetooptical disk 201, a magnetic head 202, a driver 203 of the magnetic head, an optical pickup 214, and a preamplifier 205.

A disk motor 208 rotates the disk 201. A thread mechanism 210 moves the magnetic head 202 and the optical pickup 214 in the radial direction of the disk.

In recording operation, this optical pickup 214 irradiates the disk 201 with a laser beam emitted from a semiconductor laser element (not shown) such as a laser diode. At the same time, an encoder 204 performs error correction encoding and channel encoding such as digital modulation for video data input via an interface 207. The driver 203 drives the magnetic head 202 with a driving signal modulated on the basis of the data processed by the encoder 204. In accordance with this modulated driving signal, the magnetic head 202 records the data by performing magnetic field modulation on the disk 201.

In playback operation, the pickup 214 irradiates the disk 201 with a laser beam emitted from the semiconductor laser element (not shown), detects the polarized light amount of reflected light caused by the magnetic Kerr effect, and supplies the detected amount to the preamplifier 205. The output signal from the preamplifier 205 is subjected to demodulation and error correction decoding by a decoder 206, and output to the video signal processing unit 105 shown in FIG. 1 via the interface 207.

A DC motor 211 drives the thread mechanism 210. A servo digital signal processor (DSP) 213 controls the rotational speed of the disk and servo operations of the thread mechanism 210 by using a motor driver 209 and a servo driver 212. More specifically, the servo DSP 213 controls, e.g., rotational servo of the disk and focusing servo, tracking servo, and seek servo of the pickup system.

The bus I/F 207 exchanges recording/playback data with the data bus 109 shown in FIG. 1. That is, the bus I/F 207 controls input and output of data with respect to the encoder 204 during recording and controls input and output of data with respect to the decoder 206 during playback.

A file (TOC data) structure used in this embodiment will be described below.

First, TOC data processing by the CPU 112 will be explained.

Figure 9:
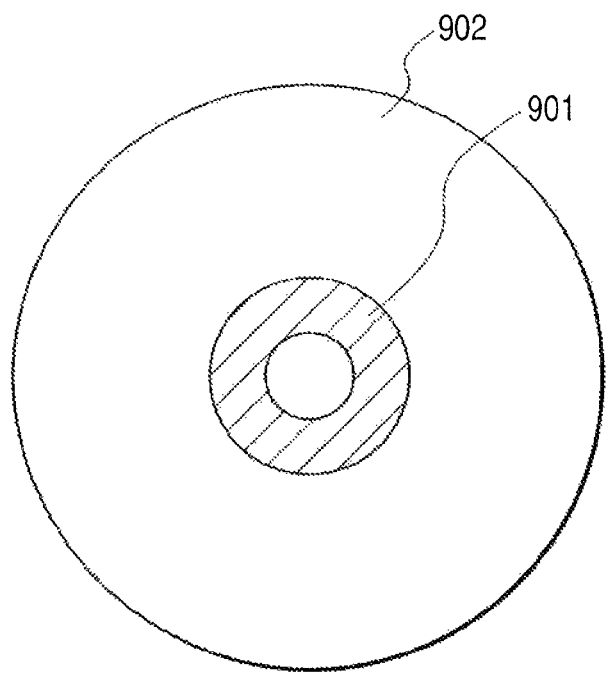
FIG. 9 is a view showing a recording format on a disk in the apparatus shown in FIG. 1.

In this embodiment, as shown in FIG. 9, an inner peripheral portion 901 of a disk is used as a system management area, and TOC data is recorded in this system management area 901. Video and audio data are recorded in a video recording area 902.

The CPU 112 writes TOC data, which is read out from a disk by the disk unit 113, into the memory 110 via the memory control unit 111. In this state, the CPU 112 updates the TOC data stored in the memory 110 in accordance with a recording or playback operation. When recording is stopped by the recording trigger switch or when the disk is to be ejected, the CPU 112 records the TOC data in the system management area 901.

Figure 3:
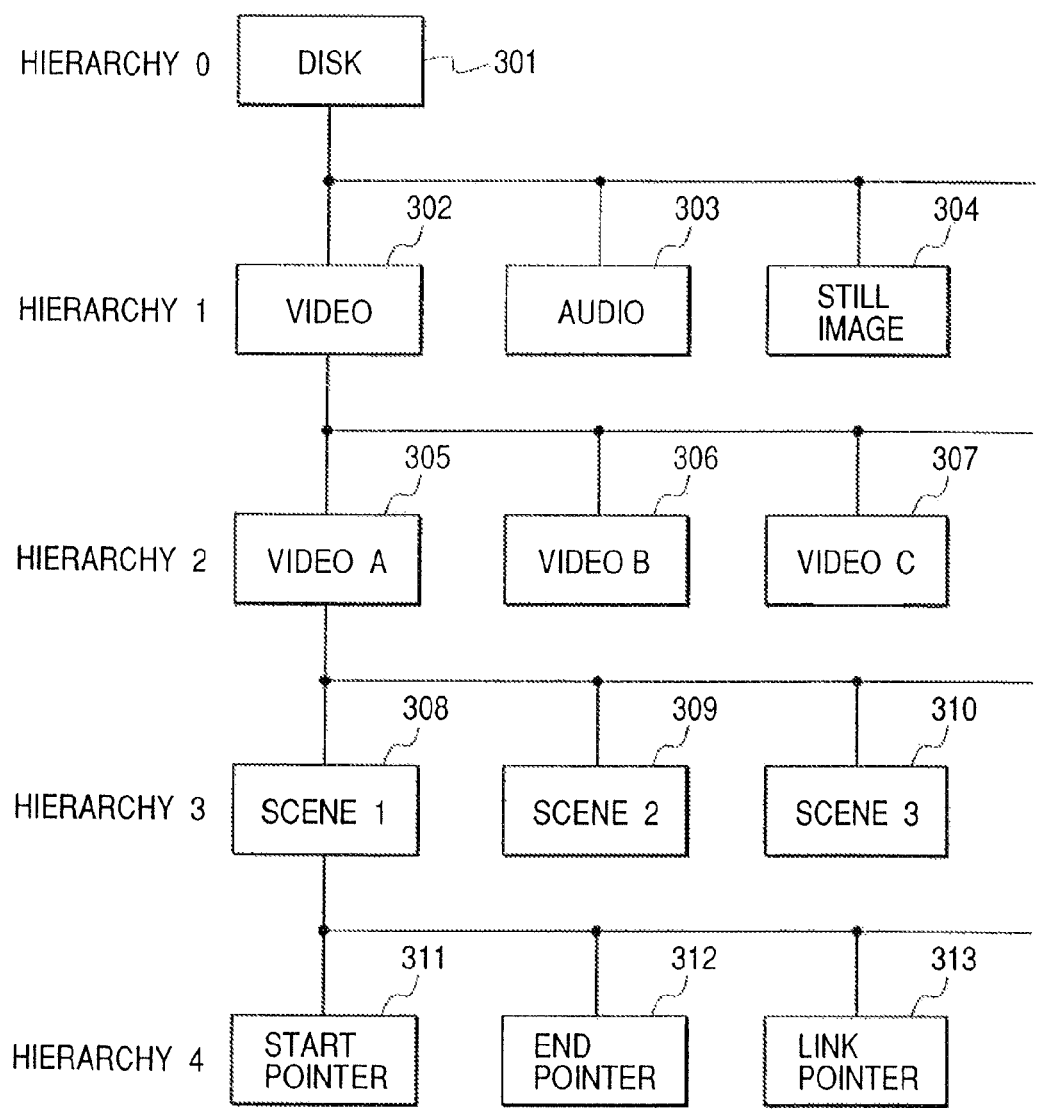
FIG. 3 is a view showing the directory structure of the apparatus shown in FIG. 1.

FIG. 3 shows the file directory structure of the recording/playback apparatus 100. Referring to FIG. 3, a disk medium 301 is defined as uppermost hierarchy 0. In lower hierarchy 1, application attributions such as video 302, audio 303, a still image 304, . . . , can be classified. In lower hierarchy 2 of any file (in FIG. 3, the video 302) defined in hierarchy 1, video A 305, video B 306, video C 307, . . . , can be classified in accordance with the dates of image pickup. Subsequently, in lower hierarchy 3 of any file (in FIG. 3, the video A 305) defined in hierarchy 2, scene 1 (308), scene 2 (309), scene 3

(310), . . . , partitioned by ON/OFF of the trigger pointer can be classified. Furthermore, in lower hierarchy 4 of any file (in FIG. 3, scene 1 (308)) defined in hierarchy 3, an image pickup start pointer 311 (address information), an image pickup end pointer 312 (address information), a link pointer 313 (address information) which allows jump during editing and playback, . . . , of scene 1 can be classified.

Figure 4:
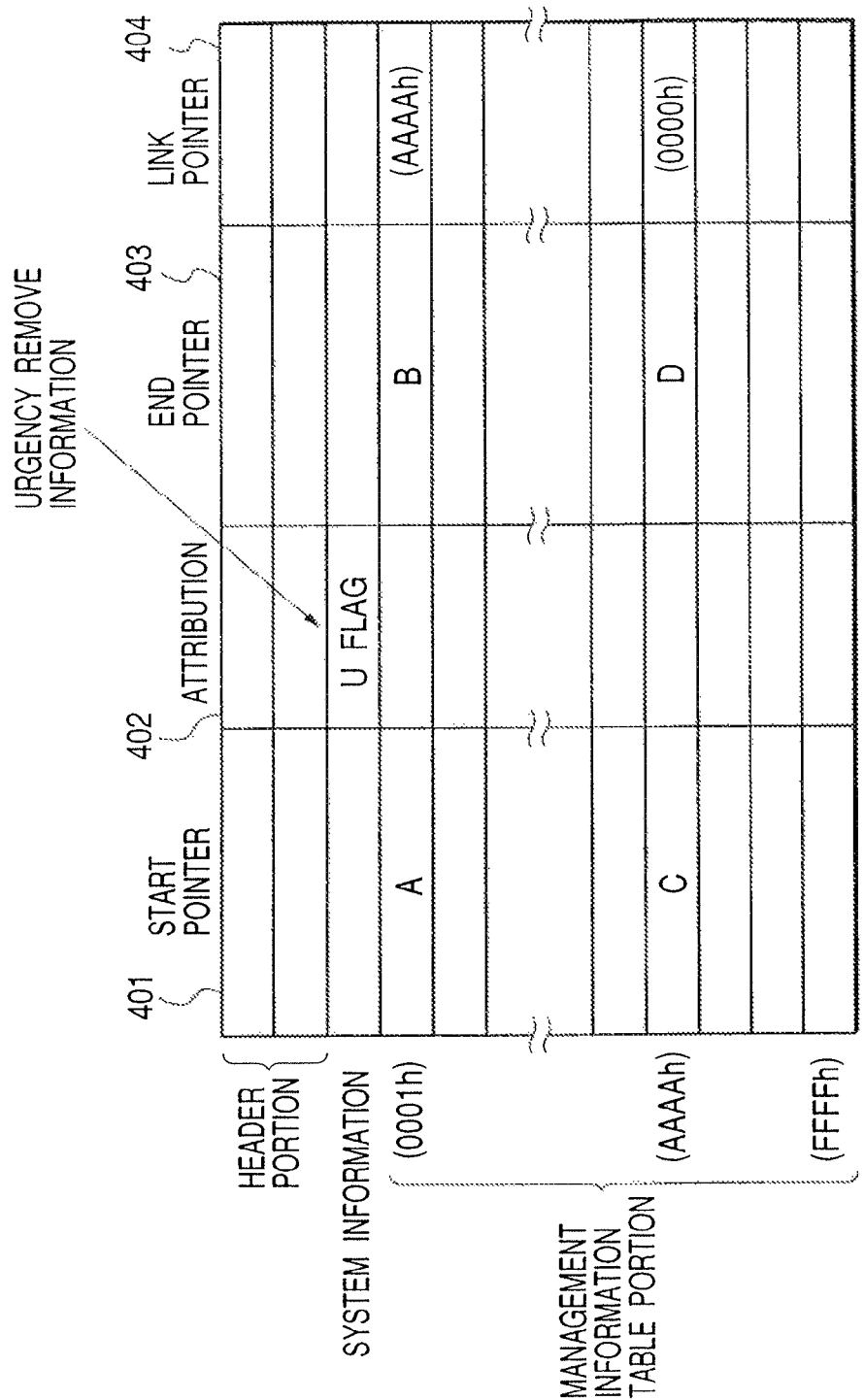
FIG. 4 is a view showing a TOC processed by the apparatus shown in FIG. 1.

Details of the TOC of the recording/playback apparatus 100 having this directory structure are shown in FIG. 4. FIG. 4 depicts the structure of the TOC. This structure is roughly classified into a TOC identification header portion containing all 0s or all 1s, system information, and a management information table portion. For each item, a start pointer 401, an attribution 402, an end pointer 403, and a link pointer 404 can be defined in units of a few bytes.

As an example, playback control of a file in directory hierarchy 3 shown in FIG. 3 will be explained with reference to FIG. 4.

First, playback is started from the address, indicated by a start pointer A of address 0001 in the management information table portion, of the video recording area on a disk medium. After the recorded data is continuously reproduced to an address indicated by an end pointer B, the operation jumps to address AAAA indicated by a link pointer. Subsequently, playback is started from the address, indicated by a start pointer C, of the video recording area on the disk medium. When the recorded data is completely reproduced to an address indicated by an end pointer D, the playback is completed. Link pointer 0000 in address AAAA is an index indicating the end of playback. The playback of image data of each scene is controlled on the basis of attribution information.

In this embodiment, as shown in FIG. 4, a U flag (Urgency Flag) is set in the attribution information 402 of the system information portion. This U flag is 1-bit digital information used to check whether a TOC recorded in the system management area of a disk is the latest one. The use of this U flag will be described in detail later.

Figure 5:
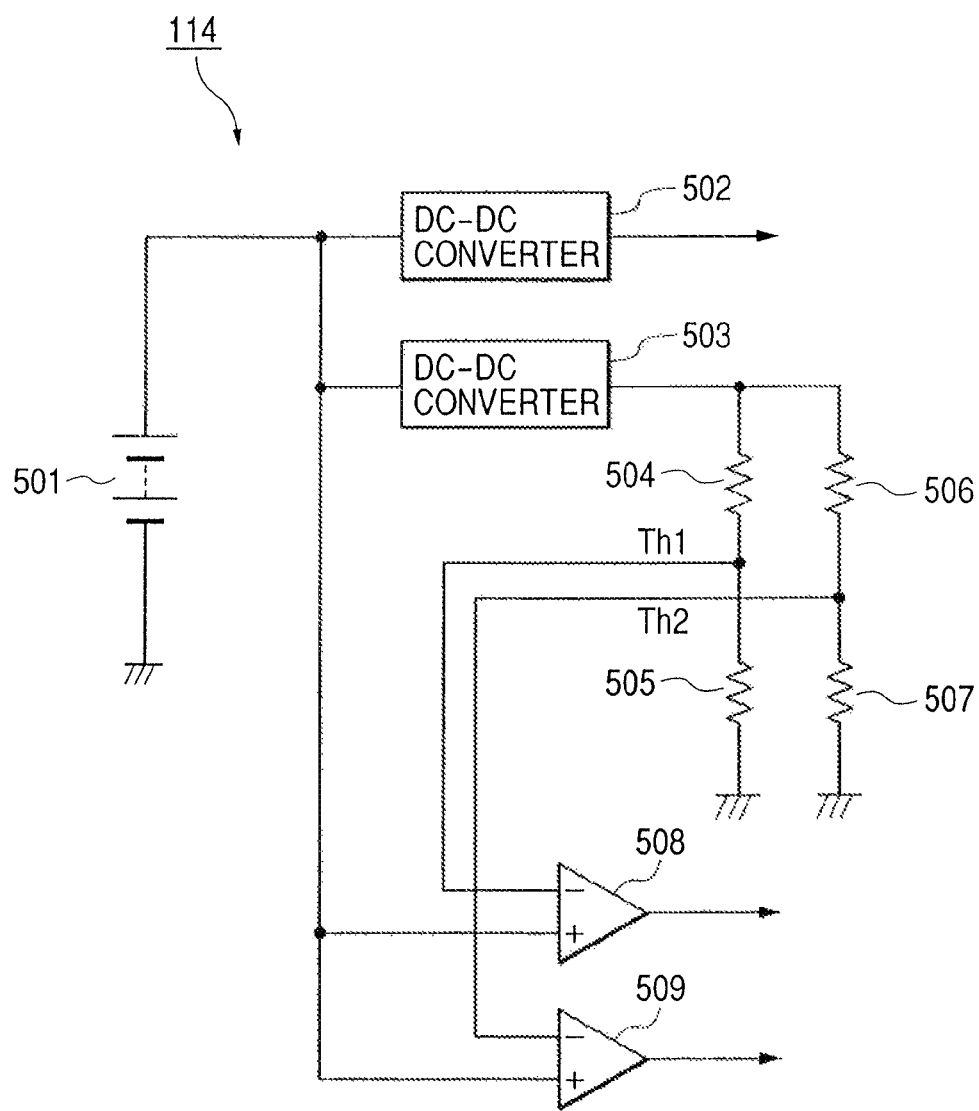
FIG. 5 is a view showing the major components of an electric power unit of the apparatus shown in FIG. 1.

FIG. 5 is a view showing the arrangement of the electric power unit 114 shown in FIG. 1. This electric power unit 114 includes a power reduction detector and monitors and detects a decrease in electric power. Referring to FIG. 5, this electric power unit 114 comprises a battery 501, DC-DC converters 502 and 503, resistors 504, 505, and 506 for dividing voltage, and comparators 508 and 509.

Electric power from the battery 501 is converted into a predetermined voltage by the DC-DC converter 502 and supplied to each circuit of the recording/playback apparatus 100. The DC-DC converter 503 and the subsequent elements detect power reduction. That is, the output voltage from the DC-DC converter 503 is divided to obtain a first threshold value (Th1) by the resistors 504 and 505 and a second threshold value (Th2) by the resistors 506 and 507. Note that Th1>Th2.

The comparator 508 compares the battery voltage 501 with Th1 and outputs a binary digital signal indicating the comparison result. On the basis of the output from this comparator 508, the CPU 112 instructs to display a power reduction warning if the battery voltage is equal to or lower than Th1. The comparator 509 compares the battery voltage 501 with Th2 and outputs a binary digital signal indicating the comparison result. On the basis of the output from this comparator 509, the CPU 112 instructs to shut down the power supply if the battery voltage is equal to or lower than Th2.

Figure 6:
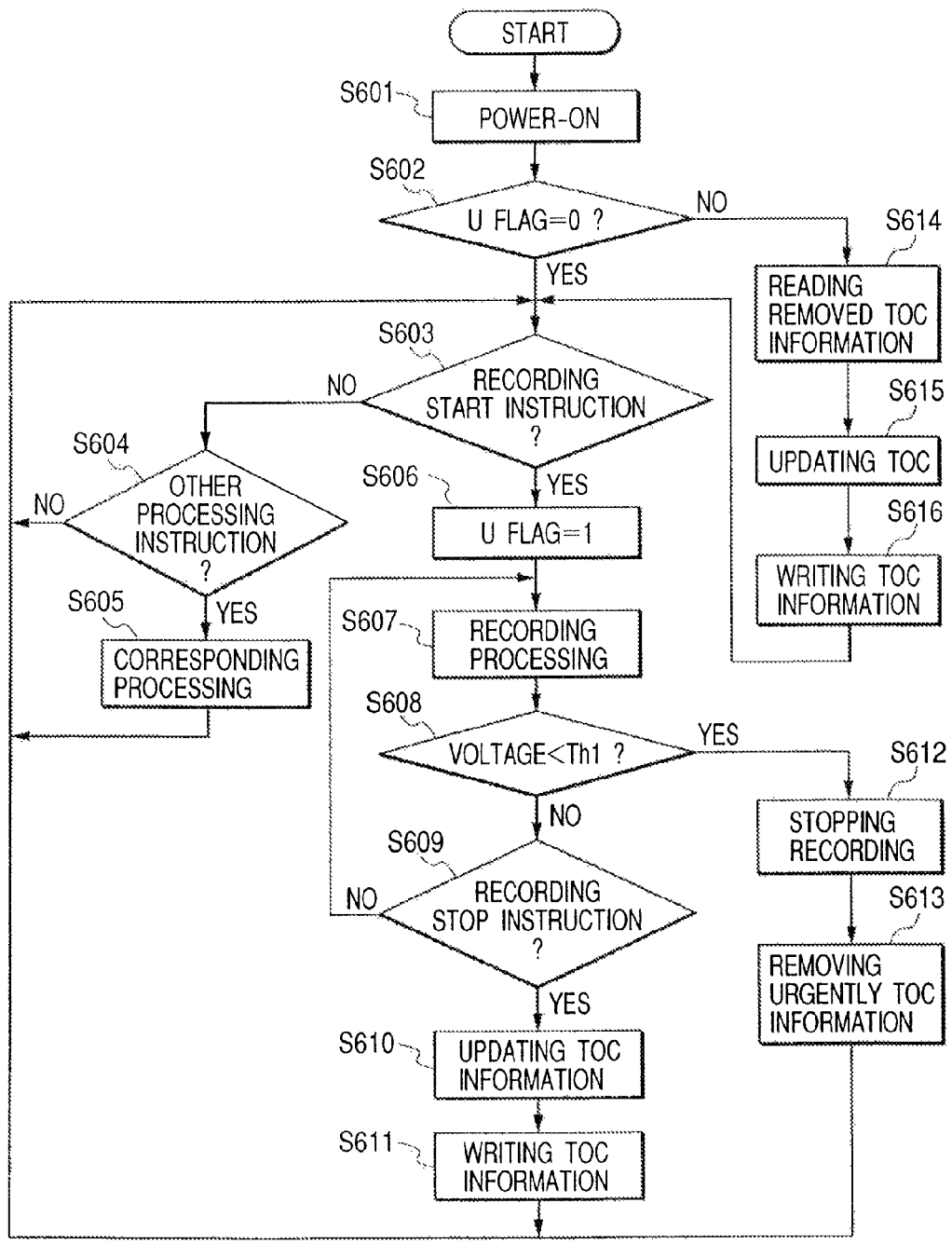
FIG. 6 is a flow chart for explaining an operation of the apparatus shown in FIG. 1.

A control operation by the CPU 112 in this embodiment will be described below with reference to FIG. 6. FIG. 6 is a flow chart for explaining recording and playback of image data and TOC data performed by the CPU 112.

First, after power-on in step S601, the CPU 112 causes the disk unit 113 to read out TOC data from the system management area 901 on the disk 201 and write the TOC data in the memory 111. In step S602, the CPU 112 checks for the U flag of the TOC stored in the memory 111. In this embodiment, if the U flag is "0", this indicates that the TOC is normally recorded in the system management area 901 of the disk 201 when the last image data is recorded; if the U flag is "1", this indicates that the TOC is not normally recorded in the system management area 901 of the disk 201 when the last image data is recorded.

If the U flag is "0" in step S602, the CPU 112 waits for a processing instruction in steps S603 and S604. If the processing instruction is other than the start of recording, the CPU 112 performs corresponding processing in step S605.

If the instruction is the start of recording, in step S606 the CPU 112 sets the U flag of the TOC data stored in the memory 111 to "1" which indicates that the TOC has not been updated, and causes the disk unit 113 to record the TOC data having this U flag "1" in the system management area 901 of the disk 201. After that, the CPU 112 performs recording processing in step S607 and at the same time always checks for the result of monitoring by the power reduction detector of the electric power unit 114 in step S608.

If the CPU 112 detects in step S608 that the battery power lowers and the voltage is below the predetermined voltage Th1, the flow advances to step S612, and the CPU 112 stops recording the image. In accordance with this recording stop position, in step S613 the CPU 112 updates the contents of the TOC data stored in the memory 111, so as to reflect the recording start pointer, end pointer, and link pointer of the image data currently being recorded, thereby urgently removing the TOC information.

In step S613, unlike normal recording processing of TOC data, the TOC data is written following the trailing end of the image data whose recording into the video information recording area 902 is stopped, without moving the head mechanism of the disk unit 113 to the system management area 901. After performing this TOC data recording processing in step S613, the CPU 112 waits for the next instruction.

On the other hand, if the battery power is not low in step S608 and a recording stop instruction is detected in step S609, in step S610 the CPU 112 updates the contents of the TOC data stored in the memory 111, so as to reflect the start pointer, end pointer, and link pointer of the latest recorded image data, and sets the U flag to "0". In step S611, the CPU 112 moves the head mechanism to the system management area 901 and writes the TOC information having the updated contents and the U flag "0" in this system management area 901.

If in step S602 the U flag is set to "1" indicating that the TOC does not show the latest contents, the flow advances to step S614.

In this case, the TOC recorded in the system management area 901 has not been updated to the latest information. Therefore, the CPU 112 sequentially searches the video recording area 902 of the disk 201 from a position indicated by the final end pointer of the latest TOC information recorded in the system management area 901, and reads out the latest TOC information recorded in the video information recording area 902 as described previously. In step S615, on the basis of the readout latest TOC information, the CPU 112 updates the contents of the TOC information stored in the memory 111 and sets the U flag to "0". In step S616, the CPU 112 records this TOC information in the system management area 901 which is the original recording area of TOC information.

The CPU 112 continues the above operation until power-off or until the battery voltage becomes lower than Th2 and then the comparator 509 shown in FIG. 5 outputs a signal indicating a power-supply voltage drop.

In this embodiment as described above, even when the battery voltage lowers during recording, TOC information reflecting the latest recorded contents can be reliably recorded.

The second embodiment will be described next. A recording/playback apparatus of this embodiment has the same configuration as the image pickup recording/playback apparatus explained with reference to FIGS. 1, 2, and 5 in the first embodiment, so a detailed description thereof will be omitted.

Figure 7:
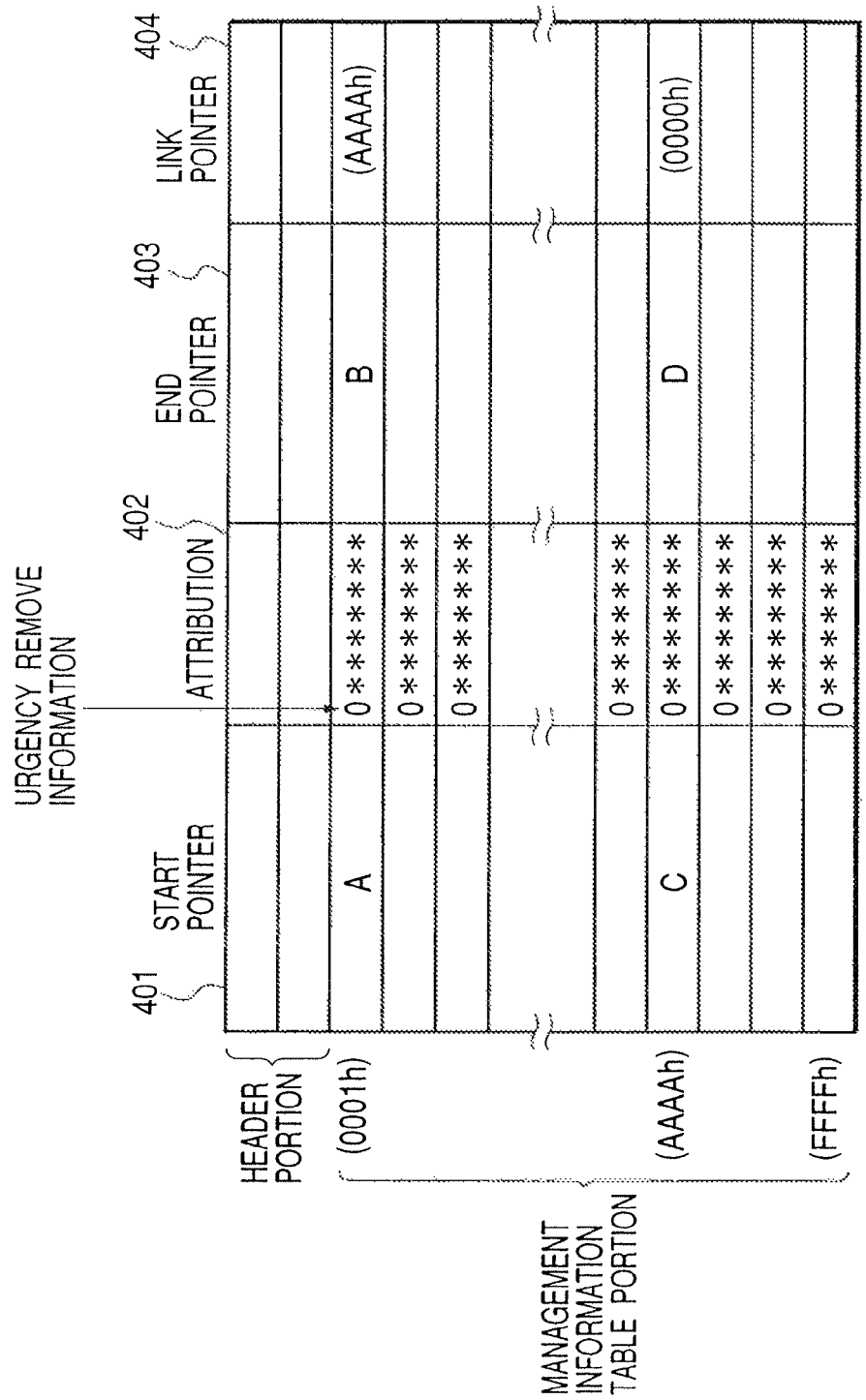
FIG. 7 is a view showing another example of the TOC processed by the apparatus shown in FIG. 1.

In the second embodiment, a TOC is constructed as shown in FIG. 7. One-bit remove information indicating that this TOC information is not normally recorded and its contents do not reflect the latest recorded contents can be described in the MSBs of attribution data 402' in a management information table portion.

Figure 8:
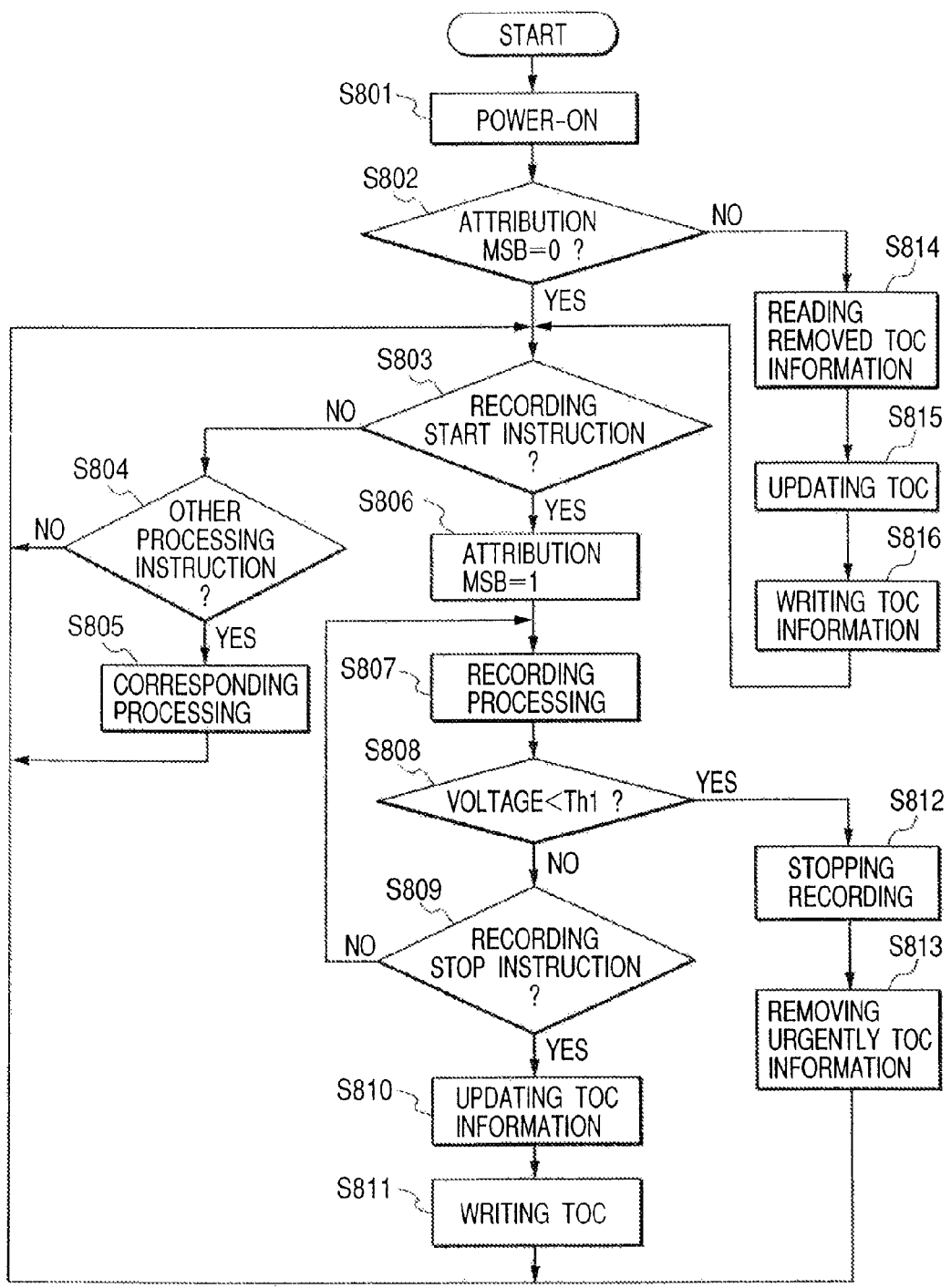
FIG. 8 is a flow chart for explaining another operation of the apparatus shown in FIG. 1.

Processing by a CPU 112 in this embodiment will be described below with reference to a flow chart in FIG. 8.

First, after power-on in step S801, the CPU 112 causes a disk unit 113 to read out TOC data from a system management area 901 on a disk 201 and write the TOC data in a memory 111. In step S802, the CPU 112 checks for all MSBs in the attributions 402' of the TOC stored in the memory 111. In this embodiment, if the MSB of the attribution 402' is "0", this indicates that the TOC is normally recorded in the system management area 901 of the disk 201 when the last image data is recorded; if the MSB is "1", this indicates that the TOC is not normally recorded in the system management area 901 of the disk 201 when the last image data is recorded and that the contents of this TOC do not correspond to the latest recorded contents.

If the MSB of the attribution 402' is "0" in step S802, the CPU 112 waits for a processing instruction in steps S803 and S804. If the processing instruction is other than the start of recording, the CPU 112 performs corresponding processing in step S805.

If the instruction is the start of recording, in step S806 the CPU 112 sets the MSB of the attribution 402' of the TOC data stored in the memory 111 to "1" which indicates that the TOC has not been updated, and causes the disk unit 113 to record the TOC data having this MSB "1" of the attribution 402' in the system management area 901 of the disk 201. After that, the CPU 112 performs recording processing in step S807 and at the same time always checks for the result of monitoring by a power reduction detector of an electric power unit 114 in step S808.

If in step S808 the CPU 112 detects the battery supply limit, i.e., detects that the battery voltage is below a predetermined voltage Th1, the flow advances to step S812, and the CPU 112 stops recording the image. In accordance with this recording stop position, in step S813 the CPU 112 updates the contents of the TOC data stored in the memory 111, so as to reflect the recording start pointer, end pointer, and link pointer of the image data currently being recorded, thereby urgently removing the TOC information.

In step S813, unlike normal recording processing of TOC data, the TOC data is written following the trailing end of the image data whose recording into a video information recording area 902 is stopped, without moving a head mechanism of the disk unit 113 to the system management area 901. After performing this TOC data recording processing in step S813, the CPU 112 waits for the next instruction.

On the other hand, if the battery power is not low in step S808 and a recording stop instruction is detected in step S809, in step S810 the CPU 112 updates the contents of the TOC data stored in the memory 111, so as to reflect the start pointer, end pointer, and link pointer of the latest recorded image data, and sets the MSB of the attribution 402' to "0". In step S811, the CPU 112 moves the head mechanism to the system management area 901 and writes the updated TOC information in this system management area 901.

If in step S802 the MSB of the attribution 402' is set to "1" indicating that the TOC does not show the latest contents, the flow advances to step S814.

In this case, the TOC recorded in the system management area 901 has not been updated to the latest information. Therefore, the CPU 112 sequentially searches the video recording area 902 of the disk 201 from a position indicated by the final end pointer of the newest TOC information recorded in the system management area 901, and reads out the latest TOC information recorded in the video information recording area 902 as described above. In step S815, on the basis of the readout latest TOC information, the CPU 112 updates the contents of the TOC information stored in the memory 111 and sets the MSB of the attribution 402' to "0". In step S816, the CPU 112 records this TOC information in the system management area 901 which is the original recording area of TOC information.

The CPU 112 continues the above operation until power-off or until the battery voltage becomes lower than Th2 and then a comparator 509 shown in FIG. 5 outputs a signal indicating a power-supply voltage drop.

In this embodiment as described above, even when the battery voltage lowers during recording, TOC information reflecting the latest recorded contents can be reliably recorded and reproduced.

In the first and second embodiments, the present invention is applied to the recording/playback apparatus 100. However, the present invention is similarly applicable to any apparatus which separately records main information and its management information in separated areas on a recording medium.

The third embodiment of the present invention will be described below with reference to the accompanying drawings.

Figure 10:
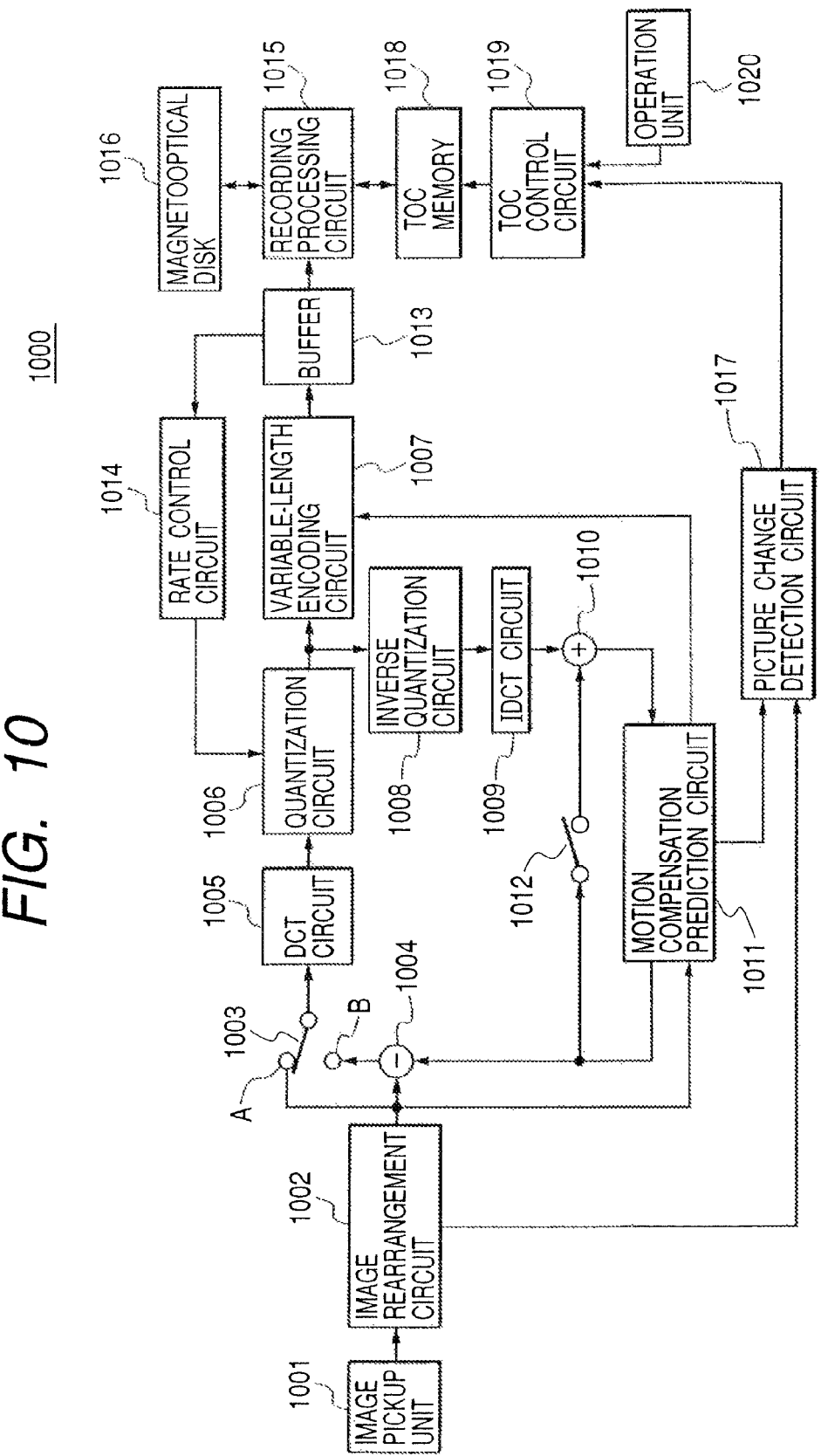
FIG. 10 is a block diagram showing the configuration of a recording apparatus according to another embodiment of the present invention.

FIG. 10 is a block diagram showing a recording apparatus 1000 according to this embodiment of the present invention.

This recording apparatus 1000 comprises an image pickup unit 1001, a picture rearrangement circuit 1002, a switch 1003, a subtractor 1004, a DCT (Discrete Cosine Transform) circuit 1005, a quantization circuit 1006, a variable-length encoding circuit 1007, an inverse quantization circuit 1008, an IDCT (Inverse Discrete Cosine Transform) circuit 1009, an adder 1010, a motion compensation prediction circuit 1011, a switch 1012, a buffer 1013, a rate control circuit 1014, a recording processing circuit 1015, a magnetooptical disk 1016, a picture change detection circuit 1017, a TOC memory 1018 for storing TOC information, a TOC control circuit 1019, and an operation unit 1020 which includes, e.g., a power switch and a recording trigger switch.

The operation will be described next.

A digital image signal obtained by the image pickup unit 1001 is input in units of frames to the picture rearrangement circuit 1002. This picture rearrangement circuit 1002 has a memory capable of storing a digital image signal having a plurality of frames. By using this memory, the picture rearrangement circuit 1002 rearranges frames of the input image signal and outputs the signal.

The operation of the picture rearrangement circuit 1002 will be explained below with reference to FIG. 11.

Figure 11:
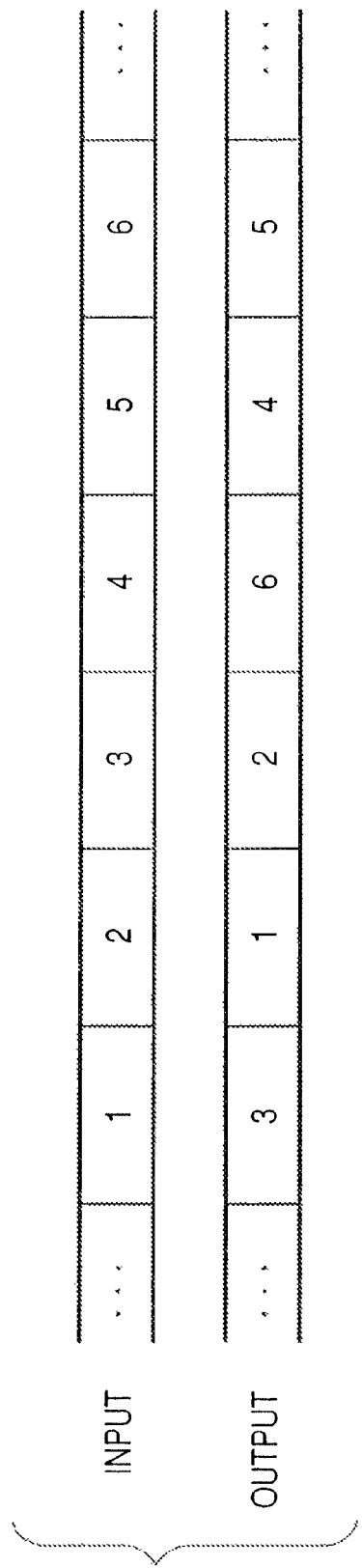
FIG. 11 is a view for explaining picture rearrangement by the apparatus shown in FIG. 10.

Referring to FIG. 11, an image signal input in units of frames in the order of a first frame, second frame, third frame, . . . , is output by rearranging these frames in the order of the third frame, first frame, second frame, . . . .

The picture rearrangement process shown in FIG. 11 is necessary to perform intra-encoding and inter-encoding for an image signal as shown in FIG. 12.

The intra-encoding is a method of encoding using only data in one frame and generates an I picture shown in FIG. 12. The inter-encoding is a method of encoding also using interframe prediction and generates P and B pictures shown in FIG. 12.

The intra-encoding and inter-encoding will be described next.

To perform the intra-encoding, the switch 1003 is closed to a terminal A. The output image data from the picture rearrangement circuit 1002 is input to the DCT circuit 1005 via the switch 1003 and orthogonally transformed. The quantization circuit 1006 quantizes the orthogonally transformed image data in accordance with a quantization coefficient determined by the rate control circuit 1014. The quantized image data is input to the inverse quantization circuit 1008 and the variable-length encoding circuit 1007.

The output image data from the picture rearrangement circuit 1002 is also input to the motion compensation prediction circuit 1011 and the picture change detection circuit 1017.

The quantized data is inversely quantized by the inverse quantization circuit 1008 and subjected to IDCT by the IDCT circuit 1009. The switch 1012 is turned off to supply the image data subjected to IDCT to the motion compensation prediction circuit 1011. The motion compensation prediction circuit 1011 generates and outputs a predictive image for the subsequent inter-encoding.

The quantized data is also input to the variable-length encoding circuit 1007 where the data is variable-length-encoded. The encoded data is input to the buffer 1013. When reaching a certain predetermined data amount, the image data in the buffer 1013 is output to the recording processing circuit 1015. This recording processing circuit 1015 has an arrangement as shown in FIG. 2 and records the data on the magnetooptical disk 1016. The recording processing circuit 1015 can record data at a higher data rate than the rate of image data input to the buffer 1013. In practice, the recording processing circuit 1015 intermittently reads out data in units of predetermined amounts of data from the buffer 1013 and records the readout data.

To perform the inter-encoding, the switch 1003 is closed to a terminal B. The subtractor 1004 is used to lower the redundancy in the time axis. This subtractor 1004 outputs the difference between the output image data from the picture rearrangement circuit 1002 and the predictive image data from the motion compensation prediction circuit 1011 to the terminal B of the switch 1003.

The output data from the subtractor 1004 is input to the DCT circuit 1005 via the switch 1003 and orthogonally transformed. The quantization circuit 1006 quantizes the orthogonally transformed image data in accordance with a quantization coefficient determined by the rate control circuit 1014. The quantized image data is input to the inverse quantization circuit 1008 and the variable-length encoding circuit 1007.

The output image data from the picture rearrangement circuit 1002 is also input to the motion compensation prediction circuit 1011 and the picture change detection circuit 1017.

The quantized data is inversely quantized by the inverse quantization circuit 1008 and subjected to IDCT by the IDCT circuit 1009. In this inter-encoding, the switch 114 is turned on to allow the adder 1010 to add the image data from the IDCT circuit 1009 and the predictive image data from the motion compensation prediction circuit 1011, thereby obtaining decoded image data. This decoded image data is input to the motion compensation prediction circuit 1011 for the subsequent image encoding. The motion compensation prediction circuit 1011 outputs predictive image data and a motion vector. This motion vector is input to the variable-length encoding circuit 1007.

The quantized data is input to the variable-length encoding circuit 1007 where the data is variable-length-encoded. The encoded data is input to the buffer 1013. When reaching a certain predetermined data amount, the image data in the buffer 1013 is output to the recording processing circuit 1015. The recording processing circuit 1015 records the image data on the disk 1016.

Recording of a TOC as index information in this embodiment will be described below.

Also in this embodiment, TOC information is recorded in a system management area 901 on a disk shown in FIG. 9.

When the power supply is turned on by the operation unit 1020, the TOC control circuit 1019 stores TOC information, read out from the system management area on the disk 1016 by the recording processing circuit 1015, in the TOC memory 1018. In accordance with recording processing, the TOC control circuit 1019 updates the contents of the TOC information stored in the TOC memory 1018. When the stop of recording is designated by the operation unit 1020, the TOC control circuit 1019 reads out the latest TOC information stored in the TOC memory 1018. The recording processing circuit 1015 records the readout TOC information in the system management area of the disk 1016.

Furthermore, the TOC control circuit 1019 records the TOC information stored in the TOC memory 1018 into the disk 1016 in accordance with an output from the picture change detection circuit 1017.

This picture change detection circuit 1017 reads out image data of a plurality of frames stored in the picture rearrangement circuit 1002 and calculates a difference A $$A = f|\text{Frame1}(Y) - \text{Frame2}(Y)| \tag{1}$$

in luminance information between frames. If this difference A is larger than a certain threshold value TH, i.e., if A>TH, the picture change detection circuit 1017 outputs a control signal indicating a picture change to the TOC control circuit 1019.

When detecting this control signal, the TOC control circuit 1019 controls the TOC memory 1018 to record TOC information which reflects the contents of recording up to the point, in the system management area of the disk 1016 by the recording processing circuit 1015, by using a period during which no image data is recorded.

FIGS. 13 and 14 are views for explaining TOC recording timings.

Symbols ★ in FIG. 13 indicate timings at which the picture change detection circuit 1017 detects a large picture change.

Referring to FIG. 13, in scene 1, TOC information is recorded in the system management area at the timings of detection of picture change 1301, temporary stop 1302, and stop of recording 1303.

As described earlier, image data is output to the recording processing circuit 1015 via the buffer 1013. Also, the recording processing circuit 1015 can record data on the disk 1016 at a higher rate than the data rate of image data input to the buffer 1013.

That is, the recording processing circuit 1015 performs intermittent recording on the disk 1016. As shown in FIG. 14, therefore, non-record periods are produced during recording of image data. FIG. 14 shows recording periods 1401 and data non-record periods 1402. Accordingly, when a picture change is detected at timing 1401a, TOC information can be recorded, even during image data recording, by moving the head to the system management area in a data non-record period 1402a.

Also, in scene 1 of FIG. 13, recording is normally stopped at timing 1303. Hence, TOC information reflecting data recorded up to this stop of recording 1303 is recorded in the disk 1016. So, all recorded data up to 1303 can be correctly reproduced.

In scene 2, TOC information is recorded in the system management area at picture change detection timings 1304 and 1305. In this example, the power supply is shut down at timing 1306 before recording stop operation, so recording is not normally stopped. However, TOC information is recorded on the disk 1016 at the timing 1305 at which a picture change is detected. The TOC information recorded at this timing 1305 reflects the contents of image data recorded up to 1305. In playback, therefore, data from the start of recording of scene 2 to the timing 1305 at which a picture change is lastly detected can be correctly reproduced.

In this embodiment, a picture change is detected by the difference between frames. However, a picture change can also be detected by another method.

Figure 15A:
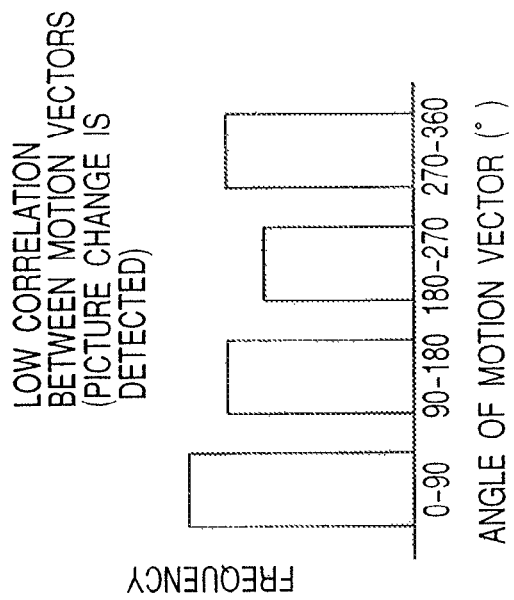
FIGS. 15A and 15B are graphs showing a picture change detection process by the apparatus shown in FIG. 14.
Figure 15B:
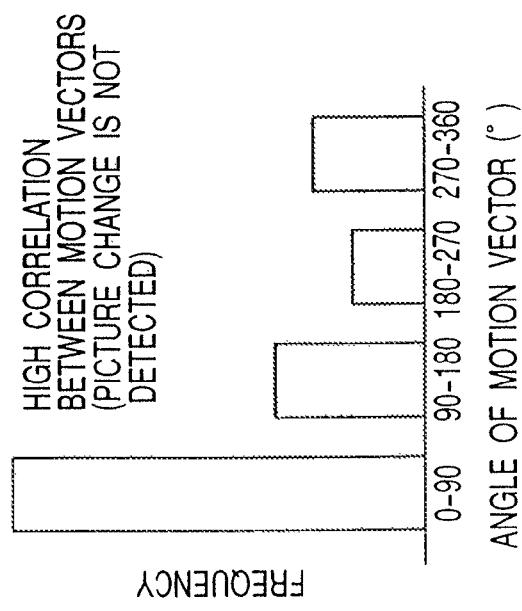

For example, as shown in FIGS. 15A and 15B, a histogram of the directions of motion vectors calculated by the motion compensation prediction circuit 113 is obtained in one frame. If the correlation between the motion vectors in one frame is low, a picture change is detected.

Referring to FIG. 15A, motion vectors having angles of 0 to 90° is largest in number, so changes between pictures are obviously small. Referring to FIG. 15B, the angles of motion vectors evenly distribute in all directions, so changes between pictures are obviously large.

A recording apparatus according to the fourth embodiment of the present invention will be described below.

Figure 16:
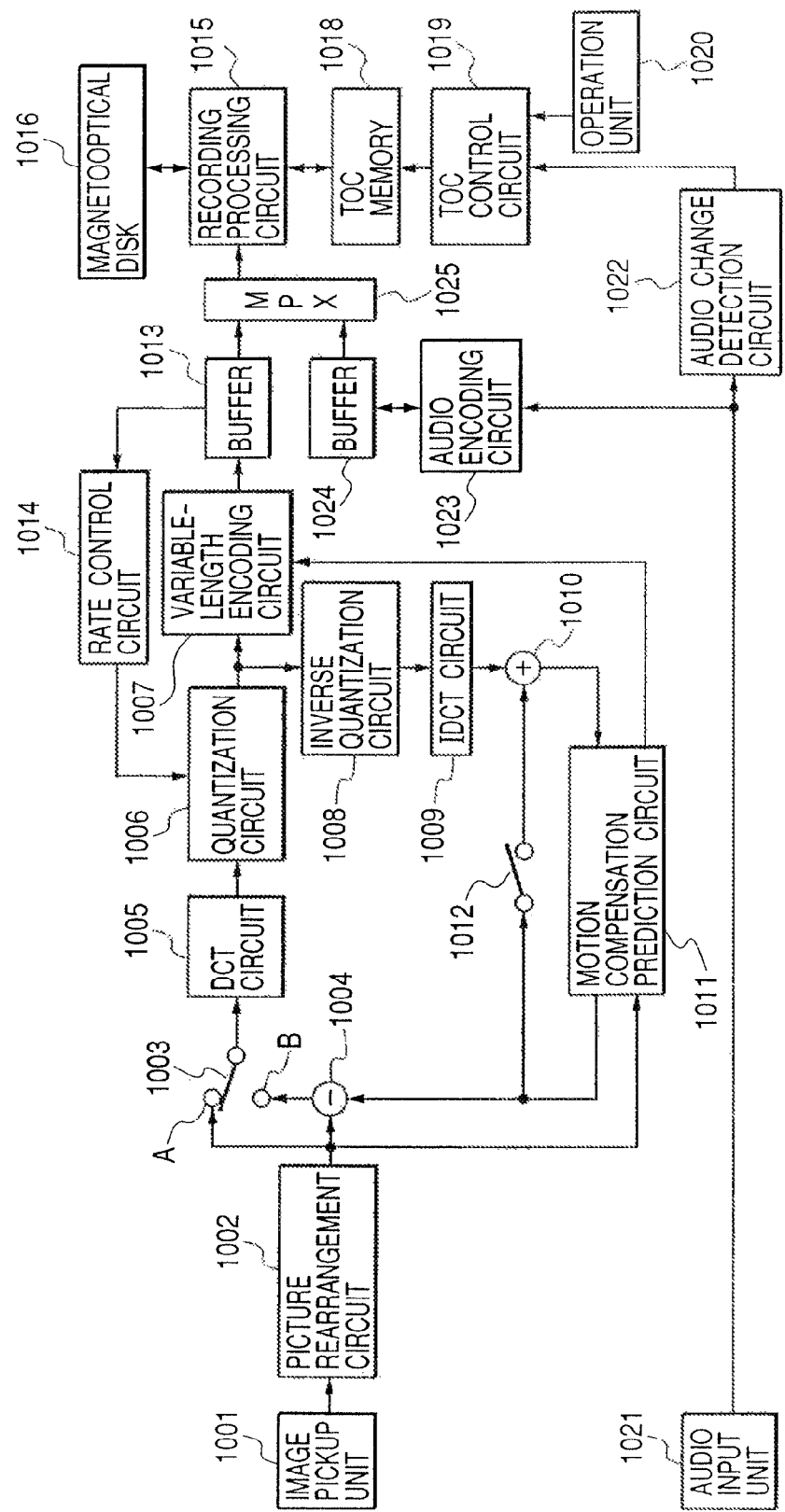
FIG. 16 is a block diagram showing the configuration of a recording apparatus according to still another embodiment of the present invention.

FIG. 16 is a block diagram showing the configuration of a recording apparatus 1000 of this embodiment. The same reference numerals as in the configuration shown in FIG. 10 denote the same parts, and a detailed description thereof will be omitted.

This apparatus shown in FIG. 16 includes an audio input unit 1021, an audio change detection circuit 1022, an audio encoding circuit 1023, a buffer 1024, and a multiplexer 1025.

Encoding of image data in FIG. 16 is the same as the apparatus shown in FIG. 10, so a detailed description thereof will be omitted. Encoded image data stored in the buffer 1013 is multiplexed with audio data by the multiplexer 1025 and output to a recording processing circuit 1015.

The audio input unit 1021 includes an audio input device such as a microphone and outputs a digital audio signal pertaining to an object to the audio change detection circuit 1022 and the audio encoding circuit 1023. The audio encoding circuit 1023 encodes this audio data by using a known coding scheme and outputs the encoded image data to the buffer 1024. The multiplexer 1025 multiplexes the image data stored in the buffer 1013 and the audio data stored in the buffer 1024 such that pictures and audio are synchronized. The multiplexed data is output to the recording processing circuit 1015.

Recording of a TOC as an important point of the present invention will be described next.

Also in this embodiment, TOC information is recorded in a system management area 901 on a disk shown in FIG. 9.

When the power supply is turned on by an operation unit 1020, a TOC control circuit 1019 stores TOC information read out from the system management area on a disk 1016 by the recording processing circuit 1015, in a TOC memory 1018. In accordance with recording processing, the TOC control circuit 1019 updates the contents of the TOC information stored in the TOC memory 1018. When the stop of recording is designated by the operation unit 1020, the TOC control circuit 1019 reads out the newest TOC information stored in the TOC memory 1018. The recording processing circuit 1015 records the readout TOC information in the system management area of the disk 1016.

In this embodiment, the TOC control circuit 1019 further records the TOC information stored in the TOC memory 1018 into the disk 1016 in accordance with an output from the audio change detection circuit 1022.

Figure 17:
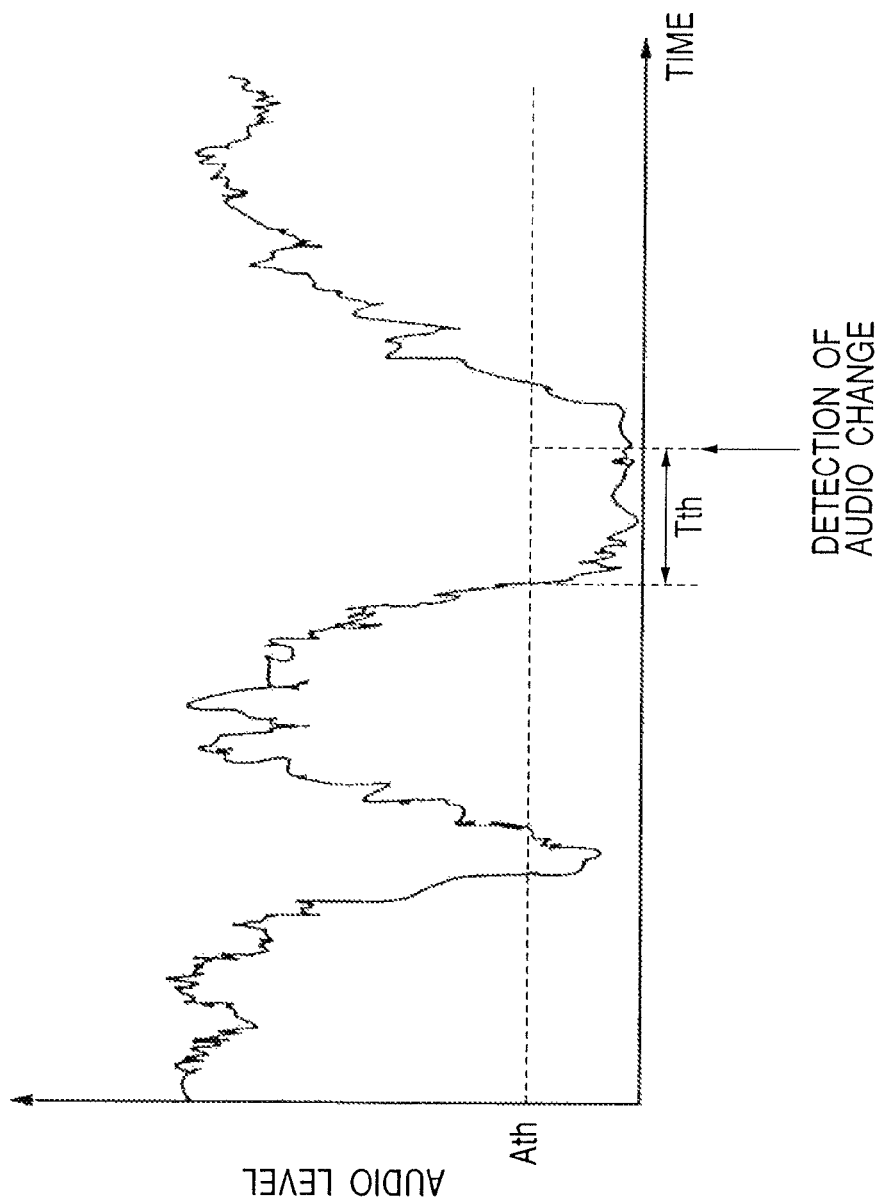
FIG. 17 is a graph for explaining the operation of an audio change detection circuit of the apparatus shown in FIG. 16.

This audio change detection circuit 1022 has a comparator and, as shown in FIG. 17, outputs a high-level signal to the TOC control circuit 1019 when a period during which the level of an input audio signal is lower than a predetermined threshold Ath continues for a predetermined time Tth or more. When the audio change detection circuit 1022 outputs this high-level control signal, the TOC control circuit 1019 controls the TOC memory 1018 to record TOC information which reflects the contents of recording up to the point, in the system management area of the disk 1016 by the recording processing circuit 1015, by using a period during which neither image data nor audio data are recorded.

Figure 18:
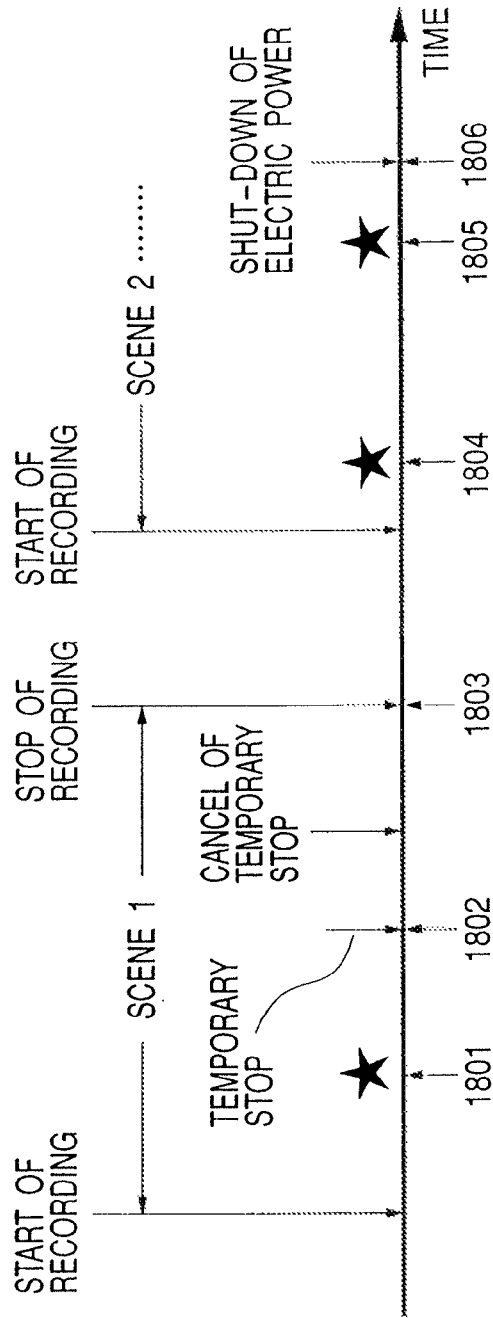
FIG. 18 is a timing chart showing the recording timings of TOC data in the apparatus shown in FIG. 16.

FIG. 18 is a view for explaining TOC recording timings.

Symbols ★ in FIG. 18 indicate timings at which the audio change detection circuit 1022 outputs a control signal indicating that a period in which the input audio level is lower than the threshold value is detected. In scene 1, TOC information is recorded in the system management area 901 of the disk 1016 at the timings of audio change detection 1801, temporary stop 1802, and stop of recording 1803.

Also in this embodiment, image data is output to the recording processing circuit 1015 via a buffer 1013. Also, the recording processing circuit 1015 can record data on the disk 1016 at a higher rate than the data rate of image data input to the buffer 1013.

That is, the recording processing circuit 1015 performs intermittent recording on the disk 1016. As shown in FIG. 14, therefore, non-record periods are produced during recording of image data. FIG. 14 shows recording periods 1401 and data non-record periods 1402. Accordingly, when a picture change is detected at timing 1401a, TOC information can be recorded, even during image data recording, by moving the head to the system management area 901 in a data non-record period 1402a.

Also, in scene 1 of FIG. 18, recording is normally stopped at timing 1803. Hence, TOC information reflecting data recorded up to this stop of recording 1803 is recorded in the disk 1016. So, all recorded data up to 1803 can be correctly reproduced.

In scene 2, TOC information can be recorded in the system management area on the disk 1016 at audio change detection timings 1804 and 1805. In this example, the power supply is shut down at timing 1806 before recording stop operation, so recording is not normally stopped.

In this embodiment, however, TOC information reflecting the contents of recording up to the point is recorded on the disk 1016 at the timing 1805 at which an audio change is detected. Therefore, data from the start of recording of scene 2 to the timing 1805 at which an audio change is lastly detected can be correctly reproduced.

The fifth embodiment of the present invention will be described below with reference to the accompanying drawings.

Figure 19:
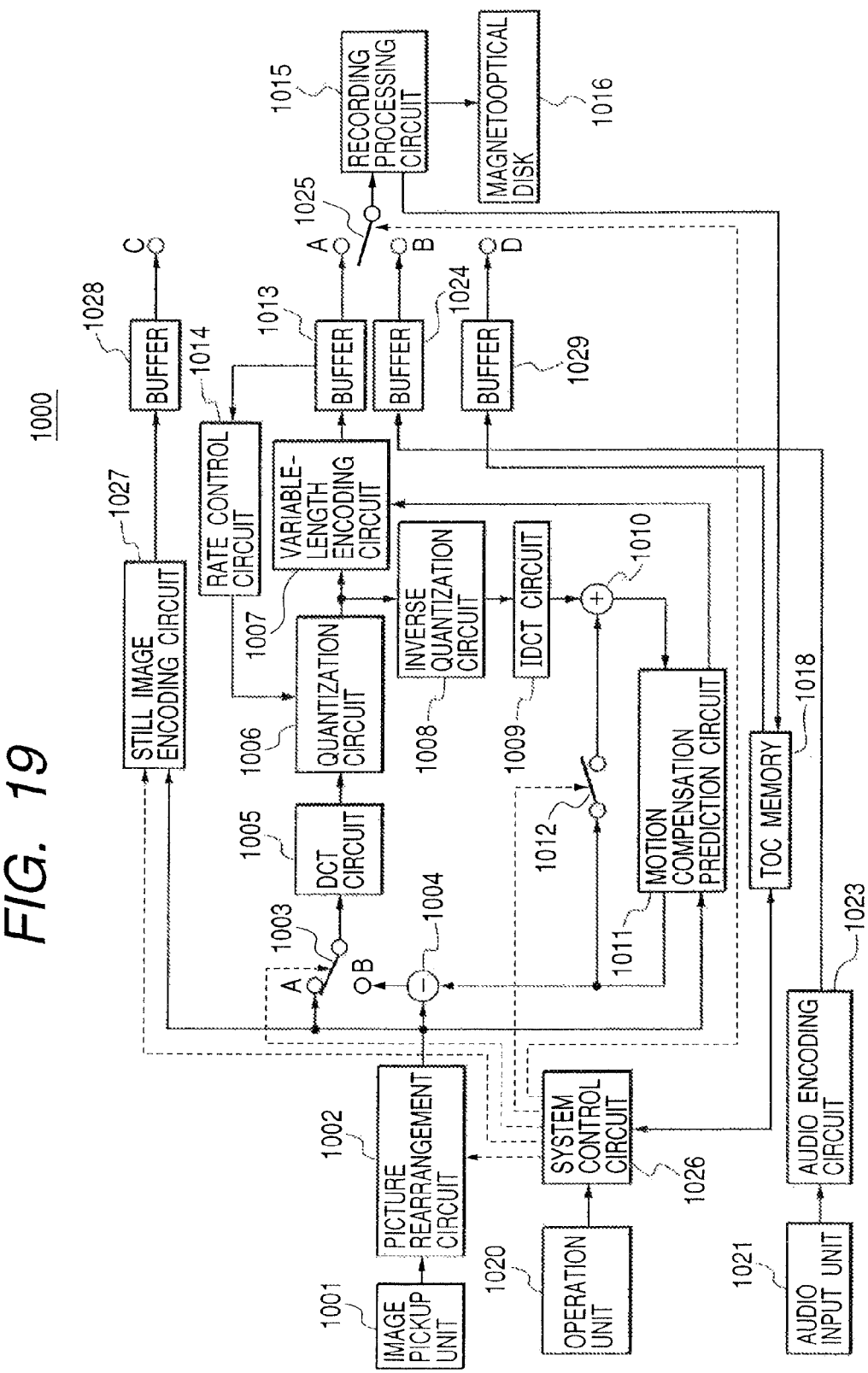
FIG. 19 is a block diagram showing the configuration of a recording apparatus according to still another embodiment of the present invention.

FIG. 19 is a block diagram showing the configuration of a recording apparatus 1000 according to this embodiment. The same reference numerals as in the configurations shown in FIGS. 10 and 16 denote the same parts, and a detailed description thereof will be omitted.

The recording apparatus of this embodiment further comprises a system control circuit 1026 for controlling the overall operation of the apparatus 1000, a still image encoding circuit 1027, a buffer 1028 for still image signals, and a buffer 1029 for TOC information.

Referring to FIG. 19, the system control circuit 1026 controls the operation of each unit of the apparatus. That is, in accordance with instructions from an operation unit 1020, the system control circuit 1026 controls a picture rearrangement circuit 1002, switches 1003 and 1012, and the still image encoding circuit 1027.

First, the operation of normal motion image recording will be described below.

When the start of motion image recording is designated by the operation unit 1020, the system control circuit 1026 controls a picture rearrangement circuit 1022 to rearrange frames of an image signal from an image pickup unit 1001 as shown in FIG. 11, and outputs the signal to a switch 1003, a subtractor 1004 and a motion compensation prediction circuit 1011. After that, this motion image signal is encoded as described earlier by, e.g., a DCT circuit 1005, a quantization circuit 1006, a variable-length encoding circuit 1007, an inverse quantization circuit 1008, an IDCT circuit 1009, an adder 1010, and the motion compensation prediction circuit 1011. The encoded signal is output to a buffer 1013.

Also, an input audio signal from an audio input unit 1021 is encoded by an audio encoding circuit 1023 and output to a buffer 1024.

The operation of still image recording will be described next.

The recording apparatus of this embodiment has a still image recording mode. When still image recording is designated by the operation unit 1020 during recording of a motion image signal, a still image signal can be recorded on a disk 1016 independently of the motion image signal.

When the operation unit 1020 designates still image recording, the system control circuit 1026 outputs a control signal to the picture rearrangement circuit 1022 to extract image data of a frame, at the timing corresponding to the still image recording instruction, from an image signal having a plurality of frames output from the image pickup unit 1001. The extracted image signal is output to the still image encoding circuit 1027.

In accordance with a control signal from the system control circuit 1026, the still image encoding circuit 1027 receives the image data of one frame output from the picture rearrangement circuit 1002, encodes the data on the basis of a JPEG standard for still image encoding, and outputs the encoded still image data to the buffer 1028. The encoding scheme of this still image encoding circuit 107 is, of course, not limited to JPEG encoding. For example, base band encoding can also be performed. The still image encoding circuit 1027 performs real-time processing at a rate of, e.g., 4 Mbits/sec.

Under the control of the system control circuit 1026, a multiplexer 1025 time-divisionally multiplexes the motion image signal and audio signal stored in the buffer 1024, the still image signal stored in the buffer 1028, and TOC information stored in the buffer 1029 (as will be described later), and outputs the multiplexed data to a recording processing unit 1015. The recording processing unit 1015 records this multiplexed data in the magnetooptical disk 1016.

Figure 20:
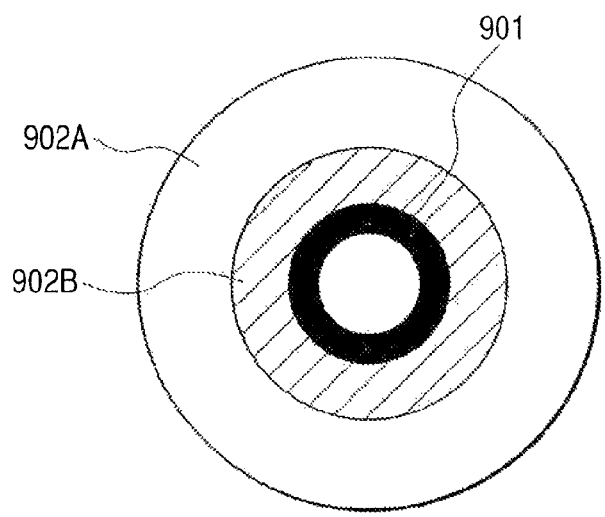
FIG. 20 is a view showing a recording format on a disk in the apparatus shown in FIG. 19.

FIG. 20 is a view showing recording areas of TOC data, motion image•audio data, and still image data on the disk 1016 according to this embodiment.

Referring to FIG. 20, TOC data is recorded in a TOC recording area 901 in the innermost peripheral portion as in FIG. 9. In this embodiment, a video recording area is divided into a motion image recording area 902A and a still image recording area 902B. That is, still image data is recorded in the still image recording area 902B outside the TOC recording area 901. Motion image•audio data is recorded in the motion image•audio recording area 902A outside the still image recording area 902B.

The still image recording area 902B and the motion image•audio recording area 902A are segmented into sectors toward the outer periphery, and these sectors are assigned sector numbers in order. Each sector is referred to by the start address, end address, and the like in TOC data.

Figure 21:
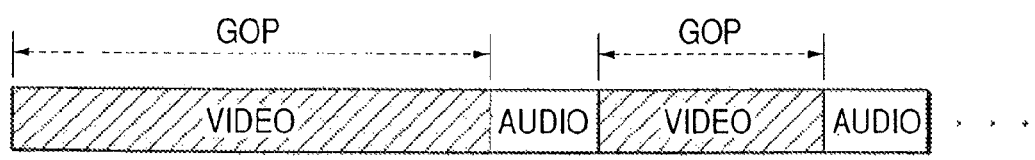
FIG. 21 is a view showing recorded data on the disk shown in FIG. 20.

As shown in FIG. 21, the recording processing circuit 1015 records variable-length motion image data in units of GOP and fixed-length audio data in a time series manner in the motion image recording area 902A on the disk 1016. In encoding of MPEG2, a plurality of frames between two I pictures are called 1GOP (Group Of Pictures) and used as a unit of encoding. Usually, 1GOP is composed of 15 frames.

When still image data is stored in the buffer 1028 in response to a still image recording instruction, the system control circuit 1026 controls the multiplexer 1025 to read out this still image data stored in the buffer 1028 by using a period during which recording of motion image data and audio data on the disk 1016 is stopped, i.e., a period 1401 shown in FIG. 14. The readout still image data is recorded in the still image recording area 902B different from the motion image recording area 902A on the disk 1016.

TOC data in this embodiment will be described below.

Figure 22:
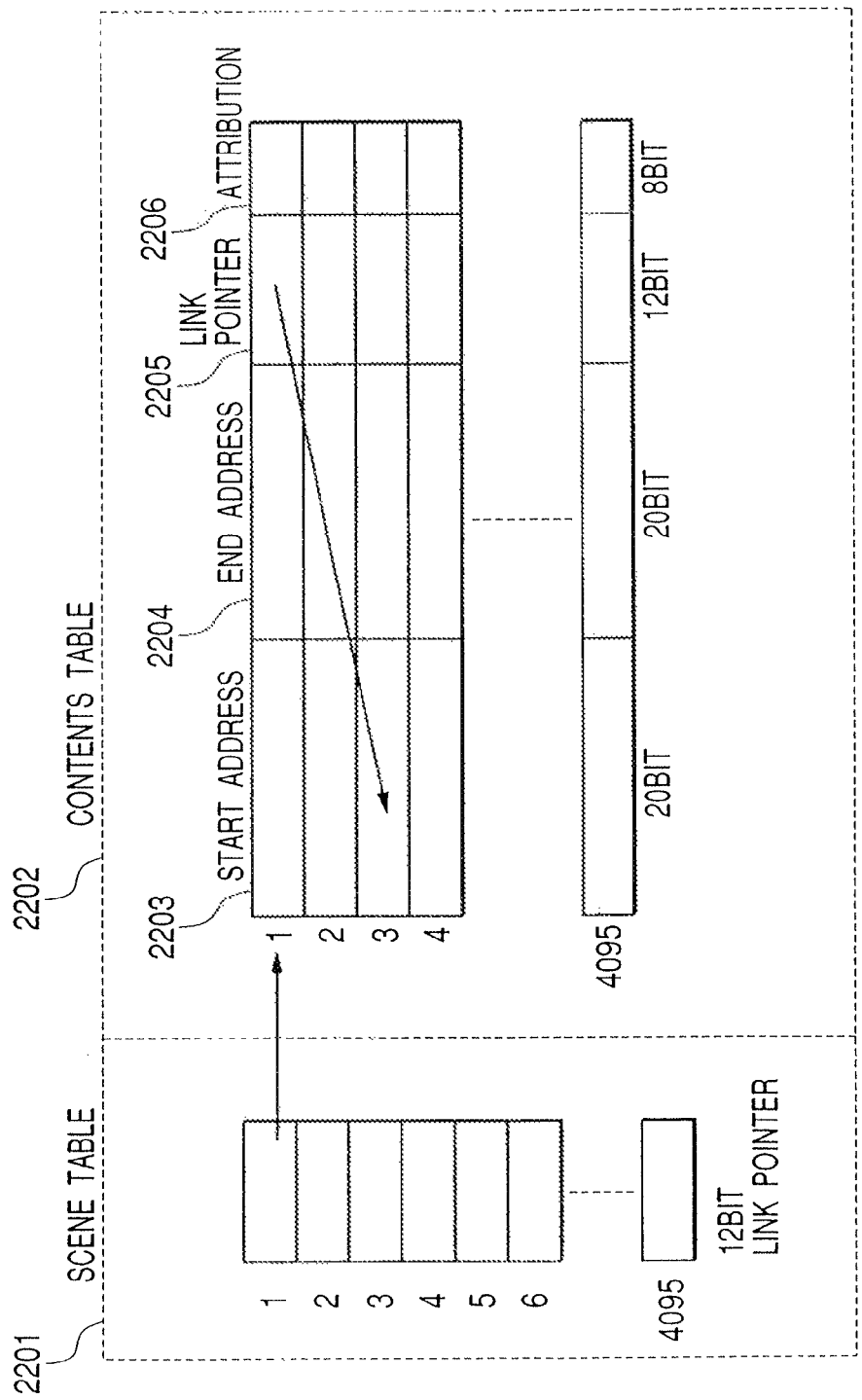
FIG. 22 is a view showing TOC data processed by the apparatus shown in FIG. 21.

FIG. 22 is a view showing the contents of TOC data according to this embodiment.

The TOC of this embodiment has a scene table 2201 and a contents table 2202. The scene table 2201 shows the order of scenes and the correspondence between each scene and a row in the contents table 2202. In playback, scenes are usually reproduced in the order in this scene table 2201.

Also, the scene table 2201 can manage 4,095 scenes, and each scene has a 12-bit pointer which indicates a specific row in the contents table 2202. This scene table 2201 is used in order from 1, and a pointer having no corresponding scene has "0" which indicates the end.

The contents table 2202 has 4,095 rows, and each row has a start address 2203, an end address 2204, a link pointer 2205, and an attribution 2206. The start address 2203 and the end address 2204 are composed of 20 bits each and have the start and end addresses, respectively, of a corresponding scene.

The link pointer 2205 has a pointer indicating the row of the continuation of a scene, when a certain scene is connected to another scene to form one scene or when one scene is dispersedly recorded in discontinuous areas owing to the locations of empty areas. As indicated by an arrow in FIG. 22, when the continuation of a scene shown in row 1 of the contents table 2202 is shown in row 3, "3" is stored in the link pointer 2205 of row 1 to hold the continuity of the scene.

The attribution 2206 stores data indicating an attribution such as motion image, still image, or copy inhibition.

Data to be processed is, of course, not restricted to motion image•audio data and still image data but can be script data and the like. The type of data can be described in the attribution 2206 of the TOC data.

A summary of updating of TOC data as management information in the present invention will be explained below. Details will be described later.

When the power supply is turned on, only TOC data is reproduced from the TOC recording area 901 on a recording medium and stored in the TOC memory 1018. The system control circuit 1026 can instantly know which data is stored in which area on the disk 1016 at present by referring to the TOC data loaded into the TOC memory 1018. To record a motion image and a still image, therefore, the system control circuit 1026 so controls as to record new data by designating an empty area on the basis of the TOC.

In this embodiment, whenever the operation unit 1020 designates still image recording, the system control circuit 1026 updates the TOC data stored in the TOC memory 1018 to have contents recorded up to that point, i.e., to have contents reflecting all pieces of information concerning motion image data recorded up to that point and still image data to be recorded henceforth.

The system control circuit 1026 outputs the TOC data having the updated contents to the buffer 1029 and records the still image data, stored in the buffer 1028, into the still image recording area 902B on the disk at the aforementioned timing. Subsequently, the system control circuit 1026 reads out the TOC data stored in the buffer 1029 and records the readout TOC data in the system management area 901 on the disk 1016. Also in this embodiment, whenever the operation unit 1020 designates the start and end of normal motion image recording, the system control circuit 1026 updates the contents of the TOC data, supplies the updated TOC data from the TOC memory 1018 to the buffer 1029, and records the TOC data in the system management area 901 on the disk 1016.

Still image recording can be designated even while no motion image is being recorded. Also in this case, TOC data is updated and recorded on the disk 1016.

In this embodiment as described above, when recording of a still image is instructed while a motion image is being recorded, TOC data reflecting recorded contents is recorded on a disk at that time.

During image pickup of one scene, therefore, even when abnormality such as a decrease in remaining battery amount occurs and recording of a motion image is not normally terminated, if still image recording is designated at least once while a motion image is being picked up, TOC data reflecting recorded contents up to that point the still image data is recorded can be recorded on a disk.

Accordingly, the motion image data, audio data, and still image data recorded up to that point can be correctly reproduced.

The present invention can be applied to a system constituted by a plurality of devices or an apparatus comprising a single device.

Further, the objects of the present invention can also be achieved by supplying a storage medium (or a recording medium) recording program codes of software for realizing the functions of the abovementioned embodiments to a system or an apparatus, and allowing a computer (e.g., a CPU or MPU) of the system or the apparatus to read out and execute the program codes stored in the storage medium. In this case, the program codes themselves read out from the storage medium realize the functions of the above embodiments, and the storage medium storing the program codes constitutes the invention. Furthermore, besides the functions of the above embodiments are realized by executing readout program codes by a computer, the present invention includes a case where an OS (Operating System) or the like running on the computer executes a part or the whole of actual processing on the basis of instructions by the program codes, and the functions of the embodiments are achieved by the processing.

The present invention also includes a case where, after the program codes read out from the storage medium are written in a memory of a function extension board inserted into a computer or of a function extension unit connected to the computer, a CPU or the like of the function extension board or function extension unit performs a part or the whole of actual processing on the basis of instructions by the program codes, and the functions of the above embodiments are accomplished by the processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus comprising:
an operation unit;
an image pickup unit configured to output a motion image signal and a still image signal, the image pickup unit outputting the still image signal in accordance with a still image recording instruction provided by the operation unit;
a recording and reproducing unit configured to record on a recording medium the motion image signal output from the image pickup unit, the still image signal output from the image pickup unit and management information indicating recording addresses of the motion image signal and the still image signal recorded on the recording medium and reproduce the management information from the recording medium;
a memory configured to store the management information reproduced by the recording and reproducing unit; and
a control unit configured to control the recording and reproducing unit such that the recording and reproducing unit starts to record the motion image signal in accordance with a motion image recording instruction provided by the operation unit and records the still image signal in accordance with the still image recording instruction,
wherein the control unit updates the management information stored in the memory in accordance with recording of the motion image signal and recording of the still image signal, and
wherein the control unit, responsive to the still image recording instruction provided during the recording of the motion image signal, updates the management information stored in the memory so as to indicate the recording address of the motion image signal being recorded at a point of time when the still image recording instruction is provided, and the recording address of the still image signal recorded in accordance with the still image recording instruction, and controls the recording and reproducing unit so as to record the updated management information on the recording medium.

2. An imaging apparatus according to claim 1, wherein the control unit controls the recording and reproducing unit so as to stop recording the motion image signal in accordance with a motion image recording stop instruction provided by the operation unit and updates the management information stored in the memory so as to indicate the recording address of the motion image signal at a time when the recording of the motion image signal is stopped.

3. An imaging apparatus according to claim 2, wherein the control unit controls the recording and reproducing unit so as to record the updated management information on the recording medium in accordance with the motion image recording stop instruction.

4. An imaging apparatus according to claim 1, wherein the control unit updates the management information stored in the memory in accordance with the still image recording instruction provided during recording of the motion image signal, so as to indicate the recording address of the motion image signal recorded in a time period from a start of recording of the motion image signal to the still image recording instruction.

5. An imaging apparatus according to claim 1, wherein the control unit updates the management information stored in the memory every time the still image recording instruction is provided during recording of the motion image signal, and controls the recording and reproducing unit so as to record the updated management information on the recording medium.

6. An imaging apparatus according to claim 1, wherein the recording and reproducing unit records the motion image signal intermittently on the recording medium, and records the still image signal which is output from the imaging unit in accordance with the still image recording instruction is provided during recording of the motion image signal, on the recording medium in a recording stop interval of the intermittent recording of the motion image signal.

7. An imaging apparatus according to claim 1, wherein the recording and reproducing unit reproduces the motion image signal and the still image signal from the recording medium, and the control unit controls a reproducing operation of the motion image signal and the still image signal by the recording and reproducing unit in accordance with the management information stored in the memory.

8. An imaging apparatus comprising:
an image pickup unit configured to output a motion image signal and a still image signal;
a recording unit configured to record on a recording medium the motion image signal output from the image pickup unit, the still image signal output from the image pickup unit and management information relating to a recording address of data recorded on the recording medium;
a control unit configured to control the recording unit such that the recording unit records the motion image signal in accordance with a motion image recording instruction and records the still image signal in accordance with a still image recording instruction,
wherein the control unit, in accordance with the still image recording instruction during recording of the motion image signal, controls the recording unit to record on the recording medium the management information indicating a recording address of the motion image signal and a recording address of the still image signal recorded in accordance with the still image recording instruction.

9. An imaging apparatus according to claim 8, further comprising:
a reproducing unit configured to reproduce the management information from the recording medium;
a memory configured to store the management information reproduced by the reproducing unit,
wherein the control unit updates the management information stored in the memory in accordance with recording of the motion image signal,
wherein the control unit, in accordance with the still image recording instruction during recording of the motion image signal, updates the management information stored in the memory so as to indicate the recording address of the still image signal recorded in accordance with the still image recording instruction,
wherein the control unit controls the recording unit, in accordance with the still image recording instruction during recording of the motion image signal, to record on the recording medium the updated management information indicating the recording address of the motion image signal and the recording address of the still image signal recorded in accordance with the still image recording instruction.

10. An imaging apparatus according to claim 8, wherein the control unit controls the recording unit so as to stop recording the motion image signal in accordance with a motion image recording stop instruction and record the management information indicating the recording address of the motion image signal at a time when the recording of the motion image signal is stopped.

11. An imaging apparatus according to claim 8, wherein the control unit controls the recording unit so as to record the management information indicating the recording address of the motion image signal being recorded on the recording medium in accordance with the still image recording instruction during recording of the motion image signal.

12. An imaging apparatus according to claim 8, wherein the recording unit records the motion image signal intermittently on the recording medium, and records the still image signal which is output from the imaging unit in accordance with the still image recording instruction is provided during recording of the motion image signal, on the recording medium in a recording stop interval of the intermittent recording of the motion image signal.

13. An imaging apparatus according to claim 8, wherein the control unit updates the management information stored in the memory in accordance with the still image recording instruction provided during recording of the motion image signal, so as to indicate the recording address of the motion image signal recorded in a time period from a start of recording of the motion image signal to the still image recording instruction.

14. An imaging apparatus according to claim 8, wherein the control controls the recording unit so as to record on the recording medium the management information indicating the recording address of the motion image signal and the recording address of the still image signal recorded in accordance with the still image recording instruction every time the still image recording instruction is provided during recording of the motion image signal.

15. An imaging apparatus comprising:
an image pickup unit configured to output a motion image signal and a still image signal;
a recording unit configured to record on a recording medium the motion image signal output from the image pickup unit, the still image signal output from the image pickup unit and management information relating to a recording address of data recorded on the recording medium;
a control unit configured to control the recording unit such that the recording unit records the motion image signal in accordance with a motion image recording instruction and records the still image signal in accordance with a still image recording instruction,
wherein the control unit, in accordance with the still image recording instruction from a start of recording of the motion image signal to a stop of recording of the motion image signal, controls the recording unit to record on the recording medium the management information indicating a recording address of the motion image signal and a recording address of the still image signal recorded in accordance with the still image recording instruction.

16. An imaging apparatus according to claim 15, further comprising:
a reproducing unit configured to reproduce the management information from the recording medium;
a memory configured to store the management information reproduced by the reproducing unit,
wherein the control unit updates the management information stored in the memory in accordance with recording of the motion image signal,
wherein the control unit, in accordance with the still image recording instruction from the start of recording of the motion image signal to the stop of recording of the motion image signal, updates the management information stored in the memory so as to indicate the recording address of the still image signal recorded in accordance with the still image recording instruction,
wherein the control unit controls the recording unit, in accordance with the still image recording instruction from the start of recording of the motion image signal to the stop of recording of the motion image signal, to record on the recording medium the updated management information indicating the recording address of the motion image signal and the recording address of the still image signal recorded in accordance with the still image recording instruction.

17. An apparatus according to claim 15, wherein the control unit, in accordance with the still image recording instruction from the start of recording of the motion image signal to the stop of recording of the motion image signal, controls the recording unit to record on the recording medium the management information indicating the recording address of the motion image signal recorded from the start of recording of the motion image signal to the still image recording instruction.

18. An apparatus according to claim 15, wherein the control unit controls the recording unit so as to stop recording the motion image signal in accordance with a motion image recording stop instruction and record the management information indicating the recording address of the motion image signal at a time when the recording of the motion image signal is stopped.

19. An imaging apparatus according to claim 15, wherein the recording unit records the motion image signal intermittently on the recording medium, and records the still image signal which is output from the imaging unit in accordance with the still image recording instruction from the start of recording of the motion image signal to the stop of recording of the motion image signal, on the recording medium in a recording stop interval of the intermittent recording of the motion image signal.

20. An imaging apparatus according to claim 15, wherein the control controls the recording unit so as to record on the recording medium the management information indicating the recording address of the motion image signal and the recording address of the still image signal recorded in accordance with the still image recording instruction every time the still image recording instruction is provided from the start of recording of the motion image signal to the stop of recording of the motion image signal.

21. An imaging method comprising the steps of:
outputting a motion image signal and a still image signal by an image pickup unit;
recording on a recording medium the motion image signal output from the image pickup unit, the still image signal output from the image pickup unit and management information relating to a recording address of data recorded on the recording medium;
controlling the step of recording such that the step of recording records the motion image signal in accordance with a motion image recording instruction and records the still image signal in accordance with a still image recording instruction,
wherein the step of controlling, in accordance with the still image recording instruction during recording of the motion image signal, controls the step of recording to record on the recording medium the management information indicating a recording address of the motion image signal and a recording address of the still image signal recorded in accordance with the still image recording instruction.

22. A method according to claim 21, further comprising the steps of:
reproducing the management information from the recording medium;
storing in a memory the management information reproduced by the step of reproducing unit,
wherein the step of controlling updates the management information stored in the memory in accordance with recording of the motion image signal,
wherein the step of controlling, in accordance with the still image recording instruction during recording of the motion image signal, updates the management information stored in the memory so as to indicate the recording address of the still image signal recorded in accordance with the still image recording instruction,
wherein the step of controlling controls the step of recording, in accordance with the still image recording instruction during recording of the motion image signal, to record on the recording medium the updated management information indicating the recording address of the motion image signal and the recording address of the still image signal recorded in accordance with the still image recording instruction.

23. A method apparatus according to claim 21, wherein the step of controlling controls the step of recording so as to stop recording the motion image signal in accordance with a motion image recording stop instruction and record the management information indicating the recording address of the motion image signal at a time when the recording of the motion image signal is stopped.

24. A method according to claim 21, wherein the step of controlling controls the step of recording so as to record the management information indicating the recording address of the motion image signal being recorded on the recording medium in accordance with the still image recording instruction during recording of the motion image signal.

25. A method according to claim 21, wherein the step of recording records the motion image signal intermittently on the recording medium, and records the still image signal which is output from the imaging unit in accordance with the still image recording instruction is provided during recording of the motion image signal, on the recording medium in a recording stop interval of the intermittent recording of the motion image signal.

26. A method according to claim 21, wherein the step of controlling updates the management information stored in the memory in accordance with the still image recording instruction provided during recording of the motion image signal, so as to indicate the recording address of the motion image signal recorded in a time period from a start of recording of the motion image signal to the still image recording instruction.

27. A method according to claim 21, wherein the step of controlling controls the step of recording so as to record on the recording medium the management information indicating the recording address of the motion image signal and the recording address of the still image signal recorded in accordance with the still image recording instruction every time the still image recording instruction is provided during recording of the motion image signal.

28. An imaging method comprising the steps of:

outputting a motion image signal and a still image signal by an image pickup unit;

recording on a recording medium the motion image signal output from the image pickup unit, the still image signal output from the image pickup unit and management information relating to a recording address of data recorded on the recording medium;

controlling the step of recording such that the step of recording records the motion image signal in accordance with a motion image recording instruction and records the still image signal in accordance with a still image recording instruction, wherein the step of controlling, in accordance with the still image recording instruction from a start of recording of the motion image signal to a stop of recording of the motion image signal, controls the step of recording to record on the recording medium the management information indicating a recording address of the motion image signal and a recording address of the still image signal recorded in accordance with the still image recording instruction.

29. A method according to claim 28, further comprising the steps of:

reproducing the management information from the recording medium;

storing the management information reproduced by the step of reproducing in a memory, wherein the step of controlling updates the management information stored in the memory in accordance with recording of the motion image signal, wherein the step of controlling, in accordance with the still image recording instruction from the start of recording of the motion image signal to the stop of recording of the motion image signal, updates the management information stored in the memory so as to indicate the recording address of the still image signal recorded in accordance with the still image recording instruction, wherein the step of controlling controls the step of recording, in accordance with the still image recording instruction from the start of recording of the motion image signal to the stop of recording of the motion image signal, to record on the recording medium the updated management information indicating the recording address of the motion image signal and the recording address of the still image signal recorded in accordance with the still image recording instruction.

30. A method according to claim 28, wherein the step of controlling, in accordance with the still image recording instruction from the start of recording of the motion image signal to the stop of recording of the motion image signal, controls the step of recording to record on the recording medium the management information indicating the recording address of the motion image signal recorded from the start of recording of the motion image signal to the still image recording instruction.

31. A method according to claim 28, wherein the step of controlling controls the step of recording so as to stop recording the motion image signal in accordance with a motion image recording stop instruction and record the management information indicating the recording address of the motion image signal at a time when the recording of the motion image signal is stopped.

32. A method according to claim 28, wherein the step of recording records the motion image signal intermittently on the recording medium, and records the still image signal which is output from the imaging unit in accordance with the still image recording instruction from the start of recording of the motion image signal to the stop of recording of the motion image signal, on the recording medium in a recording stop interval of the intermittent recording of the motion image signal.

33. A method according to claim 28, wherein the step of controlling controls the step of recording so as to record on the recording medium the management information indicating the recording address of the motion image signal and the recording address of the still image signal recorded in accordance with the still image recording instruction every time the still image recording instruction is provided from the start of recording of the motion image signal to the stop of recording of the motion image signal.

* * * * *